United States Patent
Kuroda et al.

(10) Patent No.: US 12,494,482 B2
(45) Date of Patent: Dec. 9, 2025

(54) LITHIUM METAL COMPOSITE OXIDE POWDER, POSITIVE ELECTRODE ACTIVE MATERIAL FOR LITHIUM SECONDARY BATTERIES, POSITIVE ELECTRODE, AND LITHIUM SECONDARY BATTERY

(71) Applicant: SUMITOMO CHEMICAL COMPANY, LIMITED, Tokyo (JP)

(72) Inventors: Tomoya Kuroda, Fukui (JP); Kenji Takamori, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 581 days.

(21) Appl. No.: 17/601,854

(22) PCT Filed: Feb. 26, 2020

(86) PCT No.: PCT/JP2020/007739
§ 371 (c)(1),
(2) Date: Oct. 6, 2021

(87) PCT Pub. No.: WO2020/208966
PCT Pub. Date: Oct. 15, 2020

(65) Prior Publication Data
US 2022/0199982 A1      Jun. 23, 2022

(30) Foreign Application Priority Data
Apr. 12, 2019  (JP) .................................. 2019-076523

(51) Int. Cl.
*H01M 4/36* (2006.01)
*H01M 4/13* (2010.01)
(Continued)

(52) U.S. Cl.
CPC ........... *H01M 4/366* (2013.01); *H01M 4/131* (2013.01); *H01M 4/505* (2013.01); *H01M 4/525* (2013.01);
(Continued)

(58) Field of Classification Search
CPC .. H01M 10/0525; H01M 4/366; H01M 4/525; H01M 4/505
See application file for complete search history.

(56) References Cited

U.S. PATENT DOCUMENTS

| 9,774,037 B2 | 9/2017 | Takeoka et al. |
| 2002/0127473 A1 | 9/2002 | Ooya et al. |

(Continued)

FOREIGN PATENT DOCUMENTS

| CN | 1770513 A | 5/2006 |
| CN | 104409700 A | 3/2015 |

(Continued)

OTHER PUBLICATIONS

Machine Translation of: JP 2014-127235 A, Maki, Jul. 7, 2014.*
(Continued)

*Primary Examiner* — Kenneth J Douyette
(74) *Attorney, Agent, or Firm* — Rimon P.C.

(57) ABSTRACT

A lithium metal composite oxide powder has a layered structure, and includes at least Li, Ni, an element X, and an element M. The element X is at least one element selected from the group consisting of Co, Mn, Fe, Cu, Ti, Mg, Al, W, Mo, Nb, Zn, Sn, Zr, Ga and V. The element M is at least one element selected from the group consisting of B, Si, S and P. A molar ratio of Ni to a sum of Ni and the element X, Ni/(Ni+X), is 0.40 or more. A molar ratio of the element M to a sum of Ni and the element X, M/(Ni+X), is more than 0 and 0.05 or less. The lithium metal composite oxide powder has core particles and coatings. The coatings include (Continued)

the element M at a concentration of more than 0.0185 mol/cm$^3$ and 0.070 mol/cm$^3$ or less.

10 Claims, 2 Drawing Sheets

(51) Int. Cl.
    *H01M 4/131*      (2010.01)
    *H01M 4/50*      (2010.01)
    *H01M 4/505*      (2010.01)
    *H01M 4/52*      (2010.01)
    *H01M 4/525*      (2010.01)
    *H01M 4/02*      (2006.01)
    *H01M 10/0525*      (2010.01)

(52) U.S. Cl.
    CPC ................ *H01M 2004/021* (2013.01); *H01M 2004/028* (2013.01); *H01M 10/0525* (2013.01)

(56) References Cited

U.S. PATENT DOCUMENTS

| | | | |
|---|---|---|---|
| 2011/0056824 A1* | 3/2011 | Chung | H01M 4/485 427/126.6 |
| 2015/0108397 A1 | 4/2015 | Takeoka et al. | |
| 2016/0013476 A1 | 1/2016 | Oh et al. | |
| 2016/0028082 A1 | 1/2016 | Choi et al. | |
| 2016/0301063 A1 | 10/2016 | Yukinobu et al. | |
| 2016/0329539 A1 | 11/2016 | Kawaji et al. | |
| 2017/0187065 A1 | 6/2017 | Inoue et al. | |

FOREIGN PATENT DOCUMENTS

| | | |
|---|---|---|
| CN | 106876686 A | 6/2017 |
| CN | 107437619 A | 12/2017 |
| JP | 2003-109599 A | 4/2003 |
| JP | 2012-204036 A | 10/2012 |
| JP | 2014127235 A * | 7/2014 |
| JP | 2015-099767 A | 5/2015 |
| JP | 2015-201432 A | 11/2015 |
| JP | 2015-225741 A | 12/2015 |
| JP | 2015-536558 A | 12/2015 |
| JP | 2016-110797 A | 6/2016 |
| JP | 2018-073481 A | 5/2018 |
| JP | 2019-114560 A | 7/2019 |
| WO | 2015/072359 A1 | 5/2015 |
| WO | 2015/128982 A1 | 9/2015 |
| WO | 2015/186321 A1 | 12/2015 |

OTHER PUBLICATIONS

Chinese Office Action issued in corresponding Chinese Patent Application No. 202080026604.7, dated Dec. 23, 2022, with English translation.

Extended European Search Report issued in corresponding European Patent Application No. 20787077.5, dated Dec. 14, 2022.

K. Nakagawa et al., "Novel Co2 Absorbents Using Lithium-Containing Oxides," Toshiba Review, 2001, vol. 56, No. 8, pp. 11-14.

International Search Report issued in corresponding International Patent Application No. PCT/JP2020/007739, dated Apr. 28, 2020, with English translation.

Japanese Office Action issued in corresponding to Japanese Patent Application No. 2019-076523, dated Oct. 8, 2019, with English translation.

Office Action dated on Apr. 9, 2024 issued in the corresponding Korean Patent Application No. 10-2021-7032005 w/ English Translation.

* cited by examiner

LITHIUM METAL COMPOSITE OXIDE POWDER, POSITIVE ELECTRODE ACTIVE MATERIAL FOR LITHIUM SECONDARY BATTERIES, POSITIVE ELECTRODE, AND LITHIUM SECONDARY BATTERY

CROSS REFERENCE TO RELATED APPLICATIONS

This application is the U.S. National Phase under 35 U.S.C. § 371 of International Application No. PCT/JP2020/007739, filed on Feb. 26, 2020, which claims the benefit of Japanese Application No. 2019-076523, filed on Apr. 12, 2019 the entire contents of which are hereby incorporated by reference.

TECHNICAL FIELD

The present invention relates to a lithium metal composite oxide powder, a positive electrode active material for lithium secondary batteries, a positive electrode, and a lithium secondary battery.

Priority is claimed on Japanese Patent Application No. 2019-076523, filed Apr. 12, 2019, the contents of which are incorporated herein by reference.

BACKGROUND ART

Lithium metal composite oxides are used as positive electrode active materials for lithium secondary batteries. Lithium secondary batteries have already been put to practical use not only as compact power supplies for portable telephones, notebook computers and the like, but also as medium- or large-sized power supplies for automobile use, electric power storage use, etc.

Various attempts have been made to improve battery performances of lithium secondary batteries, such as charge/discharge performance. For example, Patent Document 1 describes a positive electrode active material in which the surface of a lithium transition metal oxide is uniformly coated with a lithium boron oxide.

PRIOR ART REFERENCES

Patent Document

Patent Document 1: Japanese Unexamined Patent Application Publication (Translation of PCT Application) No. 2015-536558

SUMMARY OF THE INVENTION

Problems to be Solved by the Invention

As the application field of lithium secondary batteries expands, the positive electrode active material for lithium secondary batteries is required to have further improved charge/discharge performance.

The non-aqueous electrolytic solution used in the lithium secondary batteries may be oxidatively decomposed during charging to generate acid. Examples of such a non-aqueous electrolytic solution include a non-aqueous electrolytic solution in which $LiPF_6$ is dissolved. In such a non-aqueous electrolytic solution, $LiPF_6$ may be oxidatively decomposed during charging to generate hydrofluoric acid. The generated acid may result in promoting the elution of transition metals from the lithium metal composite oxide. The elution of the transition metals alters the composition of the lithium metal composite oxide, facilitating deterioration of batteries during charging and discharging.

The present invention has been made in view of the above situation, and the object of the present invention is to provide a lithium metal composite oxide powder that can suppress metal elution when used as a positive electrode active material for lithium secondary batteries, and a positive electrode active material for lithium secondary batteries. Another object of the present invention is to provide a positive electrode having the positive electrode active material for lithium secondary batteries, and a battery having the positive electrode.

Means to Solve the Problems

Specifically, the present invention is as enumerated in [1] to [8] below.

[1] A lithium metal composite oxide powder, which has a layered structure, and includes at least Li, Ni, an element X, and an element M, wherein, the element X is at least one element selected from the group consisting of Co, Mn, Fe, Cu, Ti, Mg, Al, W, Mo, Nb, Zn, Sn, Zr, Ga and V, and the element M is at least one element selected from the group consisting of B, Si, S and P, a molar ratio of Ni to a sum of Ni and the element X, Ni/(Ni+X), is (0.40 or more; a molar ratio of the element M to a sum of Ni and the element X, M/(Ni+X), is more than 0 and 0.05 or less, and the lithium metal composite oxide powder has core particles and coatings formed thereon, the coatings including the element M at a concentration of more than 0.0185 mol/cm and 0.070 $mol/cm^3$ or less.

[2] The lithium metal composite oxide powder according to [1], which has a BET specific surface area of 2 $m^2/g$ or less.

[3] The lithium metal composite oxide powder according to [1] or [2], wherein the coatings include a boron-containing compound.

[4] The lithium metal composite oxide powder according to any one of [1] to [3], which satisfies composition formula (I) below:

$$Li[Li_m(Ni_{(1-n-p)}X_nM_p)_{1-m}]O_2 \qquad (I)$$

wherein $-0.1 \le m \le 0.2$, $0 < n \le 0.6$, $0 < p \le 0.05$, and $0 < n+p < 0.6$.

[5] The lithium metal composite oxide powder according to [4], wherein m in the composition formula (I) satisfies: $0 < m \le 0.2$.

[6] The lithium metal composite oxide powder according to any one of [1] to [5], which has an average primary particle diameter of 1 μm or more and 7 μm or less.

[7] The lithium metal composite oxide powder according to any one of [1] to [6], wherein the coatings have an amorphous structure.

[8] A positive electrode active material for a lithium secondary battery, including the lithium metal composite oxide powder of any one of [1] to [7].

Further, the present invention has the following embodiments as well.

[9] A positive electrode including a positive electrode active material of [8].

[10] A lithium secondary battery, including the positive electrode of [9].

Effect of the Invention

The present invention can provide a lithium metal composite oxide powder that can suppress metal elution when used as a positive electrode active material for lithium secondary batteries, and a positive electrode active material for lithium secondary batteries. The present invention can also provide a positive electrode having the positive electrode active material for lithium secondary batteries, and a battery having the positive electrode.

DESCRIPTION OF THE EMBODIMENTS

Figure 1A:
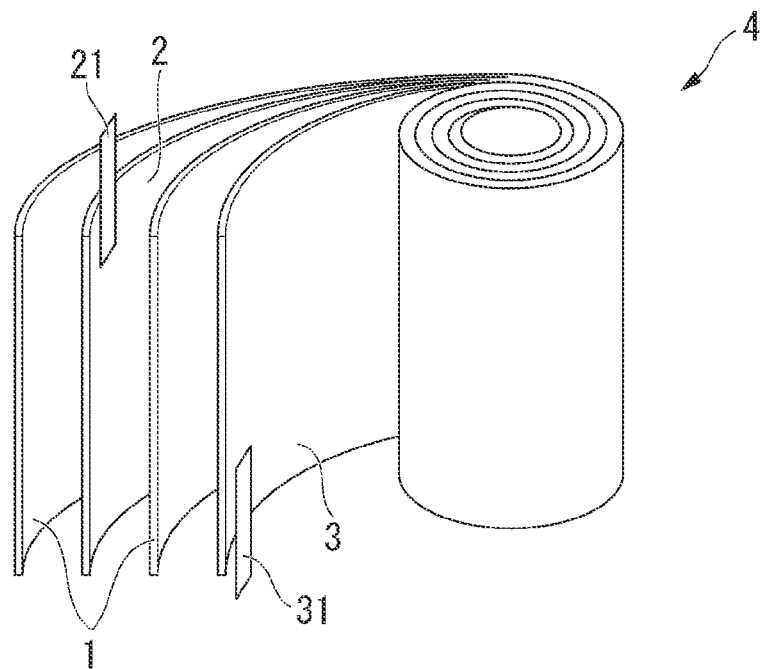
FIG. 1A is a schematic diagram showing one example of a lithium secondary batter.

The "BET specific surface area" is a value measured by the BET (Brunauer, Emmet, Teller) method. Nitrogen gas is used as an adsorption gas in the measurement of the BET specific surface area.

The BET specific surface area of the lithium metal composite oxide powder can be measured by the following method.

First, 1 g of the lithium metal composite oxide powder is dried at 105° C. for 30 minutes in a nitrogen atmosphere. Then, the measurement is performed using a BET specific surface area measuring device. As the BET specific surface area measuring device, for example, Macsorb (registered trademark) manufactured by Mountech Co., Ltd. can be used.

In the present embodiment, the composition analysis of the lithium metal composite oxide powder is carried out using an inductively coupled plasma emission spectrometer (for example, SPS3000, manufactured by SII Nano Technology Inc.).

In the present embodiment, the term "primary particle" means a particle which does not have a clear grain boundary recognizable on the particle surface when the particle is observed with a scanning electron microscope (SEM). The average particle diameter of the primary particles (average primary particle diameter) is determined by the following method.

First, the lithium metal composite oxide powder is placed on a conductive sheet attached onto a sample stage, and SEM observation is carried out by radiating an electron beam with an acceleration voltage of 20 kV using a scanning electron microscope (e.g., JSM-5510, manufactured by JEOL Ltd.). The magnification is 10000 times.

Then, 50 primary particles were arbitrarily selected in an image (SEM photograph) obtained from the SEM observation, parallel lines were drawn from a certain direction so as to sandwich the projection image of each primary particle, and the distance between the parallel lines (Feret diameter) was measured as the particle diameter of the primary particle. The arithmetic average value of the obtained particle diameters was taken as the average primary particle diameter of the lithium metal composite oxide powder.

Particles formed by aggregation of primary particles, that is, aggregates of the primary particles, are "secondary particles" When the secondary particles are observed with a scanning electron microscope with magnification of 10000 times, grain boundaries are visually recognizable.

<Lithium Metal Composite Oxide Powder>

The lithium metal composite oxide powder of the present embodiment has a layered structure.

The lithium metal composite oxide powder of the present embodiment includes at least Li, Ni, element X. and element M.

Element X

The element X is at least one element selected from the group consisting of Co, Mn, Fe, Cu, Ti, Mg, Al, W, Mo, Nb, Zn, Sn, Zr, Ga and V.

Ni/(Ni+X), which is a molar ratio of Ni to the sum of Ni and the element X, each contained in the lithium metal composite oxide powder, is 0.40 or more.

In the present embodiment, for obtaining a lithium secondary battery with high cycle performance, the element X is preferably at least one element selected from the group consisting of Co, Mn, Ti, Mg, Al, W and Zr. For obtaining a lithium secondary battery with thermal stability, the element X is preferably at least one element selected from the group consisting of Co, Mn. Al, W and Zr.

With respect to the element X, a single type thereof may be used individually or two or more types thereof may be used in combination. When two or more types of elements X are used in combination, examples of the combination include a combination of Co and Mn, a combination of Co, Mn and Zr, a combination of Co, Mn and Al, and a combination of Co. Mn. W and Zr.

In the present embodiment. Ni/(Ni+X), which is a molar ratio of Ni to the sum of Ni and the element X, each contained in the lithium metal composite oxide powder, is 0.40 or more, preferably 0.45 or more, more preferably 0.50 or more, and particularly preferably 0.55 or more. The upper limit of Ni/(Ni+X) is not particularly limited and may be, for example, 0.95, 0.90, or 0.8.

The upper limit values and lower limit values can be combined in any manner. With respect to the combination of the upper limit values and lower limit values, for example. Ni/(Ni+X) may be 0.40 or more and (1.95 or less, 0.45 or more and 0.95 or less, 0.50 or more and 0.90 or less, or 0.55 or more and 0.8 or less.

When the value of Ni/(Ni+X) is within the above range, the cycle performance can be improved.

Element M

The element M is at least one element selected from the group consisting of B, Si, S and P. M/(Ni+X), which is a molar ratio of the element M to the sum of Ni and the element X, is more than 0 and 0.05 or less with respect to the total amount of the lithium metal composite oxide powder.

The element M can form a compound having lithium ion conductivity when bonded with lithium and oxygen. In the present embodiment, for obtaining a lithium secondary battery with high cycle performance, the element M is preferably at least one element selected from the group consisting of B, S. and P. and is more preferably B.

In the present embodiment, the molar ratio M/(Ni+X) is preferably 0.0001 or more, more preferably 0.0005 or more, even more preferably 0.001 or more, even more preferably 0.003 or more, even more preferably 0.004 or more, and particularly preferably 0.05 or more. The upper limit of M/(Ni+X) may be, for example, 0.04, 0.03, or 0.025.

The upper limit values and lower limit values can be combined in any manner. With respect to the combination of the upper limit values and lower limit values, for example, M/(Ni+X) may be 0.0001 or more and 0.04 or less, 0.0005 or more and 0.03 or less, 0.001 or more and (1.025 or less, 0.003 or more and (3.025 or less, 0.004 or more and 0.025 or less, or (1.005 or more and 0.025 or less.

When M/(Ni+X) is not less than the lower limit value described above, it becomes easier to form coatings of a uniform composition. When M/(Ni+X) is not more than the upper limit value described above, the battery resistance tends to decrease when the lithium metal composite oxide powder of the present embodiment is used as the positive electrode active material.

Combination of Element X and Element M

In the present embodiment, examples of the combination of the element X and the element M include the following combinations The element X is Co and Mn, while the element M is B The element X is Co. Mn and Al, while the element M is B.

The element X is Co. Mn and Zr, while the element M is B.

The element X is Co, Mn, Al and Zr, while the element M is B.

The element X is Co and Mn, while the element M is S.

The element X is Co, Mn and Al, while the element M is S.

The element X is Co. Mn and Zr, while the element M is S

The element X is Co, Mn, Al and Zr, while the element M is S.

The element X is Co and Mn, while the element M is P.

The element X is Co, Mn and Al, while the element M is P.

The element X is Co. Mn and Zr, while the element M is P.

The element X is Co, Mn, Al and Zr, while the element M is P.

The lithium metal composite oxide powder of the present embodiment includes core particles and coatings that cover the surfaces of the core particles. The core particles preferably contain a compound containing at least Li, Ni, and the elements X. The coatings preferably contain the element M and preferably contain a compound that is a reaction product between the element M and lithium Examples of the compound constituting the coatings include a compound in which the element M, lithium and oxygen are bonded together. The coatings may be coating layers or coating particles.

In the present embodiment, the term "coating" means a coating present on a part or all of the surface of a core particle. When a part of the surface of the core particle is covered with a coating, the coating is preferably distributed over a region of at least 50% or more of the surface of the core particle, more preferably 70% or more of the surface of the core particle.

The coatings are preferably in the form of coating layers of a uniform thickness, formed on the surfaces of the core particles.

<<Coatings>>

The concentration of the element M contained in the coatings is 0.0185 mol/cm$^3$ or more and 0.070 mol/cm$^3$ or less, preferably 0.0200 mol/cm$^3$ or more and 0.068 mol/cm$^3$ or less, and more preferably 0.0220 mol/cm$^3$ or more and 0.065 mol/cm$^3$ or less.

With regard to the method for forming the core particles and the coatings, detailed description will be made below. Briefly, the core particles containing a compound containing at least Li, Ni and the element X are formed, and then a compound containing the element M is added to form coatings on the surfaces of the core particles.

In the present embodiment, the coatings preferably include a boron-containing compound. Examples of such a compound include a compound in which lithium, boron, and oxygen are bonded together.

With regard to the effect obtained when the concentration of the element M contained in the coatings is within the above range, explanation is made below by taking the case w here the element N is boron as an example.

The non-aqueous electrolytic solution contained in the lithium secondary battery (for example, a non-aqueous electrolytic solution in which LiPF$_6$ is contained as a solute in an electrolytic solution) may be oxidatively decomposed during charging to generate acid (for example, hydrofluoric acid). When the generated acid comes into contact with the core particles, this accelerates the elution of the metal elements (for example, transition metal elements such as manganese element) constituting the core particles. As a result, the composition of the core particles changes, causing deterioration of battery performances such as cycle performance.

In addition, the metal component eluted from the core particles causes the destruction of an SEI (solid electrolyte interphase) layer of the negative electrode, which contributes to charging and discharging. The destruction of the SEI layer affects battery life and efficiency.

For preventing the electrolytic solution from coming into direct contact with the core particles, it is desirable that the core particles are protected by coatings. For achieving longer battery life, the coatings are preferably composed of a compound that is difficult to dissolve in the electrolytic solution.

When the element M is boron, it is assumed that a lithium-boron-oxygen compound is formed as the coatings. A lithium-boron-oxygen compound is not easily decomposed in an electrolytic solution in which an acid such as hydrofluoric acid is present That is, the lithium-boron-oxygen compound acts as a protective layer for the core particles when the lithium metal composite oxide powder comes into contact with the electrolytic solution.

On the other hand, when the coatings formed are thick or contain a large amount of impurities, the resistance during insertion and extraction of lithium increases. In this context, the term "impurities" typically means compounds having low lithium conductivity (for example, B$_2$O$_3$).

It is presumed that in the coatings with the element M concentration of not lower than the lower limit value described above, a lithium-boron-oxygen compound is formed in such an amount that the compound can act as protective layers for the core particles. Therefore, the core particles are protected from hydrofluoric acid in the electrolytic solution, and the metal components constituting the core particles can be prevented from eluting into the electrolytic solution.

The element M concentration of not more than the upper limit value described above is presumed to allow the coatings to have such a thickness that that the coatings can function as protective layers without becoming resistance layers. Moreover, the abundance of impurities in the coatings is presumed to be small. Such coatings have good lithium conductivity and show less resistance during insertion and extraction of lithium, thereby enabling the lithium metal complex oxide powder to improve the charge/discharge performance of the battery when used as a positive electrode active material.

The above-mentioned effect is likewise exhibited even when the element M is an element other than boron. The "element other than boron" refers to one or more elements selected from the group consisting of Si, S and P.

Method for Measuring Element M contained in Coatings

The concentration of the element M contained in the coatings (unit: mol/cm) is calculated by the following equation (1).

Concentration of element M contained in coatings (unit: mol/cm³)=Amount of element M contained in coatings (unit: mol/g)/[BET specific surface area (unit: cm²/g)×Average thickness of coatings (unit: cm)]   Equation (1)

In the equation (1), the amount of the element M is determined by the following method.

First, the obtained lithium metal composite oxide powder is dissolved in hydrochloric acid. Then, the composition analysis is implemented using an inductively coupled plasma emission spectrometer (for example, SPS3000 manufactured by SII Nano Technology Inc.), and the obtained amount of the element M (mol/g) is defined as the amount of the element M contained in the coatings.

In the equation (1), the BET specific surface area is a value measured with respect to the obtained lithium metal composite oxide powder by the method described above.

In the equation (1), the average thickness of the coatings is determined from the analysis results obtained using a scanning electron microscopy (SEM)-energy dispersive X-ray spectroscopy (EDX).

Specifically. SEM observation of the lithium metal composite oxide powder is implemented with magnification of 10,00) times using a scanning electron microscope (for example, JSM-7900F manufactured by JEOL Ltd.) to obtain an SEM photograph. 50 primary particles were randomly selected from the primary particles shown in the SEM photograph, and EDX measurement is implemented using an energy dispersive X-ray spectrometer (for example, X-Max Extreme manufactured by Oxford Instruments). The concentrations of Ni, the element X and the element M in each primary particle are measured by the EDX measurement From the concentrations of Ni, the element X, and the element M obtained by the EDX measurement, the concentration ratio of the element M to the sum of Ni and the element X is calculated. Then, the thickness of the coating containing the element M is calculated from the analysis using the concentration ratio.

For the analysis, for example, the probe mode of an analysis software (AZtec Layer, a product of Oxford Instruments) can be used. The analysis can be performed on a model in which the element M alone is laminated on a manganese-cobalt-nickel oxide substrate, to thereby determine the thicknesses of the coatings containing the element M. The average value of the thicknesses of the coatings containing the element M, calculated for the 50 randomly selected primary particles, is defined as the average thickness of the coatings.

In the present embodiment, the coatings preferably have an amorphous structure without a crystal structure. The amorphous structure of the coatings makes it easier for the coatings to change shapes thereof in response to swelling of the core particles due to occlusion of lithium ions and shrinkage of the core particles due to release of lithium ions. In this instance, while the battery is being charged and discharged, detachment of the coatings as well as voids and cracks between the core particles and the coatings is less likely to occur, and metal elution can be further reduced.

The amorphous structure of the coatings can be confirmed by, for example, lack of peaks other than a peak ascribed to the raw material compound described below in X-ray diffraction spectrum of the lithium metal composite oxide powder obtained by powder X-ray diffraction measurement using CuKα rays. Alternatively, the amorphous structure of the coatings can also be confirmed by the halo shown by an electron diffraction pattern of a minute region in the coated region using a transmission electron microscope (TEM), or a fast Fourier transform (FFT) pattern of a scanning transmission electron microscope (STEM) image.

The lithium metal composite oxide powder of the present embodiment is preferably represented by the composition formula (I) below:

$$Li[Li_m(Ni_{(1-n-p)}X_nM_p)_{1-m}]O_2 \quad (I)$$

wherein −0.1≤m≤0.2, 0<n≤0.6, 0<p≤0.05, and n+p<0.6.

In the composition formula (I), for improving the cycle performance, m is preferably more than 0, more preferably 0.01 or more, and particularly preferably 0.02 or more. Further, for obtaining a lithium secondary battery with high discharge rate performance, m is preferably 0.1 or less, more preferably 0.08 or less, and particularly preferably 0.06 or less.

The upper limit values and lower limit values of m can be combined in any manner. As for the combination of the upper limit values and the lower limit values of m, for example, m satisfies 0<m≤0.1, 0.01≤m≤0.1, 0.01≤m≤0.08, 0.01≤m≤0.06, or 0.02≤m≤0.06.

In the present embodiment, 0<m≤0.2 is preferable, and 0<n≤0.1 is more preferable.

In the composition formula (I), for obtaining a lithium secondary battery with low internal resistance, n is more preferably 0.05 or more, and particularly preferably 0.1 or more. Further, for obtaining a lithium secondary battery with high thermal stability, n is preferably 0.5 or less, and particularly preferably 0.4 or less.

The upper limit values and lower limit values of n can be combined in any manner. As for the combination of the upper limit values and the lower limit values of n, for example, n satisfies 0.05≤n≤0.5, or 0.10≤n≤0.4.

In the composition formula (I), for further improving the cycle performance, p is more preferably 0.0002 or more, and particularly preferably 0.0005 or more. Further, p is preferably 0.09 or less, more preferably 0.08 or less, and particularly preferably 0.07 or less.

The upper limit values and lower limit values of p can be combined in any manner. As for the combination of the upper limit values and the lower limit values of p, for example, p satisfies 0.0002≤p≤0.09, 0.0005≤p≤0.08, or 0.0015≤p≤0.07.

In the present embodiment, 0.0002≤p≤0.9 is preferable.

In the composition formula (I), for obtaining a lithium secondary battery with high discharge rate performance, n p preferably satisfies 0<n+p≤0.5, and more preferably 0<n+p≤0.25, and even more preferably 0<n+p≤0.2.

As for the combination of m, n and p, it is preferable that 0<m≤0.1, 0<n≤0.8, and 0.0002≤p≤0.09.

In the present embodiment, the composition formula (I) is preferably the following composition formula (I)-1:

$$Li[Li_m(Ni_{(1-n-p)}X_nM_p)_{1-m}]O_2 \quad (I)$$

wherein −0.1≤m≤0.2, 0<y≤0.4, 0<z≤0.4, 0<p≤0.05, and y+z+p<0.6; and the element Q is at least one element selected from the group consisting of Mn, Fe, Cu, Ti, Mg, Al, W, Mo, Nb, Zn, Sn, Zr, Ga and V.

In the composition formula (I)-1, for obtaining a lithium secondary battery with low internal resistance, y is preferably 0.005 or more, more preferably 0.01 or more, and even more preferably 0.05 or more. For obtaining a lithium secondary battery with high thermal stability, y is preferably 0.35 or less, and more preferably 0.33 or less.

The upper limit values and lower limit values of y can be combined in any manner. As for the combination of the upper limit values and the lower limit values of y, for example, y satisfies $0.005 \leq y \leq 0.35$, $0.01 \leq y \leq 0.33$, or $0.05 \leq y \leq 0.33$.

In the present embodiment, it is preferable that $0 \leq y \leq 0.35$.

In the composition formula (I)-1, for obtaining a lithium secondary battery with high cycle performance, z is preferably 0.01 or more, more preferably 0.02 or more, and even more preferably 0.1 or more. For obtaining a lithium secondary battery with higher storage stability under high temperature conditions (e.g., at 60° C.), z is preferably 0.39 or less, more preferably 0.38 or less, and even more preferably 0.35 or less.

The upper limit values and lower limit values of z can be combined in any manner. As for the combination of the upper limit values and the lower limit values of z, for example, z satisfies $0.01 \leq z \leq 0.39$, $0.02 \leq z \leq 0.38$, or $0.10 \leq z \leq 0.35$.

In the present embodiment, it is preferable that $0 \leq z \leq 0.35$.

In the composition formula (I)-1, the preferable range for m is the same as the preferable range for m in the composition formula (I) described above.

In the composition formula (I)-1, the preferable range for p is the same as the preferable range for p in the composition formula (I) described above.

In the composition formula (I)-1, for obtaining a lithium secondary with high cycle performance, y+z+p preferably satisfies $0 < y+z+p \leq 0.5$, more preferably $0 < y+z+p \leq 0.25$, and even more preferably $0 < y+z+p \leq 0.2$.

The lithium metal composite oxide powder of the present embodiment has a BET specific surface area of preferably 2 m²/g or less, more preferably 2.0 m²/g or less, even more preferably 1.5 m²/g or less, even more preferably 1.0 m²/g or less, and particularly preferably 0.9 m²/g or less.

The lithium metal composite oxide powder of the present embodiment preferably has a BET specific surface area of 0.1 m²/g or more, more preferably 0.2 m²/g or more, even more preferably 0.3 m²/g or more, and particularly preferably 0.4 m²/g or more.

When the BET specific surface area is not more than the upper limit value described above, the volumetric capacity density of the lithium secondary battery tends to increase. When the BET specific surface area is not less than the lower limit value described above, the lithium metal composite oxide powder used as the positive electrode active material is allowed to have a large contact area with the electrolytic solution, so that the battery resistance tends to decrease.

In the lithium metal composite oxide powder of the present embodiment, the average primary particle diameter is preferably 1 μm or more and 7 μm or less.

In the lithium metal composite oxide powder of the present embodiment, the average primary particle diameter is more preferably 1.1 μm or more, even more preferably 1.2 μm or more, and particularly preferably 1.3 μm or more.

Further, the average primary particle diameter is preferably 6.5 μm or less, more preferably 6 μm or less, and particularly preferably 5.5 μm or less.

The upper limit values and lower limit values can be combined in any manner.

As for the combination of the upper limit values and lower limit values, the average primary particle diameter may be, for example, 1.1 μm or more and 6.5 μm or less, 1.2 μm or more and 6 μm or less, and 1.3 μm or more and 5.5 μm or less.

The average primary particle size of the lithium metal composite oxide powder within the above range means less amount of coarse primary particles with excessive grain growth (Layered Structure)

In the present embodiment, the crystal structure of the positive electrode active material is a layered structure, and more preferably a hexagonal crystal structure or a monoclinic crystal structure.

The hexagonal crystal structure belongs to any one of the space groups selected from the group consisting of P3, $P3_1$, $P3_2$, R3, P-3, R-3, P312, P321, $P3_1 12$. $P3_1 21$, $P3_2 12$, $P3_2 21$, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3/m$, P622, $P6_1 22$, $P6_5 22$, $P6_2 22$, $P6_4 22$, $P6_3 22$, P6 mm, P6cc, $P6_3 cm$, P63mc, P-6m2, P-6c2, P-62m, P-62c, P6/mmm, P6/mcc, $P6_3/mcm$, and $P6_3/mmc$.

The monoclinic crystal structure belongs to any one of the space groups selected from the group consisting of P2, $P2_1$, C2, Pm, Pc, Cm, Cc. P2/m, P24/m, C2/m, P2/c, $P2_1/c$, and C2/c.

Among the aforementioned crystal structures, for obtaining a lithium secondary battery with high discharge capacity, the particularly preferable crystal structure is a hexagonal crystal structure belonging to R-3m or a monoclinic crystal structure belonging to C2/m.

<Method for Producing Lithium Metal Composite Oxide Powder]

The method for producing the lithium metal composite oxide powder of the present embodiment is preferably a production method implementing the following steps (1), (2), (3) and (4) in this order.

(1) A step of producing a precursor of a lithium metal composite oxide powder.

(2) A step of mixing the precursor with a lithium compound to obtain a mixture.

(3) A step of calcining the mixture to obtain a raw material compound.

(4) A step of mixing the raw material compound with a compound containing the element M to obtain a lithium metal composite oxide powder.

[(1) Step of Producing Precursor of Positive Electrode Active Material for Lithium Secondary Batten]

First, a nickel-containing metal composite compound is prepared, which includes metals other than lithium, that is, nickel as an essential metal, and the elements X (at least one metal selected from the group consisting of Co, Mn, Fe, Cu, Ti, Mg, Al, W, Mo, Nb, Zn, Sn, Zr, Ga and V). As the nickel-containing metal composite compound which is a precursor, a nickel-containing metal composite hydroxide or a nickel-containing metal composite oxide can be used.

The precursor can be produced by the conventionally known batch co-precipitation method or continuous co-precipitation method. Hereinbelow, the method for producing the precursor is explained taking as an example the case of production of a nickel-cobalt-manganese metal composite hydroxide containing nickel, cobalt and manganese as metals. In the following descriptions, a nickel-cobalt-manganese metal composite hydroxide containing nickel, cobalt and manganese may be simply referred to as a "metal composite hydroxide".

First, a nickel salt solution, a cobalt salt solution, a manganese salt solution and a complexing agent are reacted by the continuous co-precipitation method described in Japanese Patent Unexamined Publication No 2002-201028 to produce a metal composite hydroxide represented by $Ni_s Co_t Mn_u(OH)$, wherein $s+t+u=1$.

The range of s is the same as the range of 1-y-z-p in the above composition formula (I)-1.

The range of t is the same as the range of y in the above composition formula (I)-1.

The range of u is the same as the range of z in the above composition formula (I)-1.

There is no particular limitation with respect to a nickel salt as a solute in the aforementioned nickel salt solution. For example, at least one of nickel sulfate, nickel nitrate, nickel chloride and nickel acetate can be used.

As a cobalt salt as a solute in the cobalt salt solution, for example, at least one of cobalt sulfate, cobalt nitrate, cobalt chloride and cobalt acetate can be used.

As a manganese salt as a solute in the manganese salt solution, for example, at least one of manganese sulfate, manganese nitrate, manganese chloride and manganese acetate can be used.

These metal salts are used in a ratio corresponding to the composition ratio of the aforementioned $Ni_xCo_tMn_u(OH)_2$. That is, the metal salts are used in a ratio such that the molar ratio of nickel, cobalt, and manganese in a mixed solution containing the metal salts coincides with s:t:u.

By adjusting the amounts of the metal salts, the ratio (Ni/(Ni+X)) of Ni to the sum of Ni and the element X, each contained in the lithium metal composite oxide powder, can be adjusted.

The solvent of the nickel salt solution, the cobalt salt solution, and the manganese salt solution is water. That is, the nickel salt solution, the cobalt salt solution, and the manganese salt solution are aqueous solutions.

The complexing agent is a compound capable of forming a complex with nickel ions, cobalt ions, and manganese ions in an aqueous solution. Examples of the complexing agent include ammonium ion donor, hydrazine, ethylenediaminetetraacetic acid, nitrilotriacetic acid, uracil diacetic acid and glycine. Examples of the ammonium ion donor include ammonium salts such as ammonium hydroxide, ammonium sulfate, ammonium chloride, ammonium carbonate, and ammonium fluoride.

In the step of producing the metal composite hydroxide, the complexing agent may or may not be used. When the complexing agent is used, the amount of the complexing agent contained in a mixture containing the nickel salt solution, the solutions of the optional metal salts and the complexing agent is, for example, more than 0 and 2.0 or less, in terms of a molar ratio thereof relative to the total number of moles of the metal salts (the nickel salt and the optional metal salts). In the present embodiment, the amount of the complexing agent contained in a mixture containing the nickel salt solution, the cobalt salt solution, the manganese salt solution, and the complexing agent is, for example, more than 0 and 2.0 or less, in terms of a molar ratio thereof relative to the total number of moles of the metal salts (the nickel salt, the cobalt salt, and the manganese salt).

In the co-precipitation method, in order to adjust the pH value of the mixture containing the nickel salt solution, the optional metal salt solutions and the complexing agent, an alkali metal hydroxide is added to the mixture before the pH of the mixture changes from alkaline to neutral. The alkali metal hydroxide is, for example, sodium hydroxide or potassium hydroxide.

The pH value in the context of the present specification is defined as a value measured when the temperature of the mixture is 40° C. The pH of the mixture is measured when the temperature of the mixture sampled from the reaction vessel reaches 40° C. When the temperature of the sampled mixture is lower than 40° C., the mixture is heated to 40° C. and the pH is measured. When the temperature of the sampled mixture is higher than 40° C., the mixture is cooled to 40° C. and the pH is measured.

Successive addition of the aforementioned nickel salt solution, cobalt salt solution and manganese salt solution as well as the complexing agent to a reaction vessel allows nickel, cobalt and manganese to react with each other, resulting in the generation of $Ni_sCo_tMn_u(OH)_2$.

The reaction is performed while regulating the temperature in the reaction vessel within the range of, for example, 20° C. to 80° C., preferably 30° C. to 70° C.

In the reaction, the pH value in the reaction vessel is regulated, for example, within the range of 9 to 13, preferably 11 to 13.

The content of the reaction vessel is mixed by appropriately stirring the content. With respect to the reaction vessel used in the continuous co-precipitation method, one which allows the overflow for separation of the precipitated reaction product can be used.

With respect to various properties of the lithium metal composite oxide powder to be finally obtained, the properties can be desiredly controlled by appropriately adjusting the metal salt concentrations of the metal salt solutions to be supplied to the reaction vessel, agitation speed, reaction temperature, reaction pH, and calcination conditions described below, and the like.

Specifically, the inside of the reaction vessel may be an inert atmosphere. An inert atmosphere suppresses aggregation of elements which are more likely to be oxidized than nickel. Therefore, a uniform metal complex hydroxide can be obtained.

Alternatively, the inside of the reaction vessel may have a suitable oxygen-containing atmosphere. The oxidizing atmosphere may be an oxygen-containing atmosphere in which an oxidizing gas is mixed with an inert gas, or may be provided by allowing an oxidizing agent to be present in an inert gas atmosphere. When the inside of the reaction vessel is in an appropriate oxidizing atmosphere, transition metals contained in the mixed solution are appropriately oxidized, and the morphology of the metal complex oxide can be easily controlled.

Examples of the oxidizing agent include peroxides such as hydrogen peroxide, peroxide salts such as permanganate, perchlorate, hypochlorite, nitric acid, halogen, ozone, and the like.

With regard to the oxygen and the oxidizing agent in the oxidizing atmosphere, there is no particular limitation as long as enough oxygen atoms to oxidize the transition metals are allowed to be present.

In a case where the oxidizing atmosphere is an oxygen-containing atmosphere, the atmosphere in the reaction vessel can be controlled by a method involving flowing an oxidizing gas into the reaction vessel to bubble the mixed solution with the oxidizing gas, or the like.

After the reaction as described above, the obtained reaction product is washed with water and, then, dried, thereby obtaining a nickel-cobalt-manganese metal composite hydroxide as the nickel-cobalt-manganese composite compound.

For isolation of the reaction product, a method involving dehydrating a slurry containing the reaction product (coprecipitate slurry) by centrifugation, suction filtration or the like is preferably used.

In a case where a simple washing with mater allows impurities derived from the mixed solution to remain in the reaction product, the reaction product may be washed with a weak acid water or an alkaline solution. Examples of the alkaline solution include an aqueous solution containing sodium hydroxide and an aqueous solution containing potassium hydroxide.

Further, the reaction product may be washed with a washing liquid containing a sulfur element. Examples of the washing liquid containing a sulfur element include an aqueous solution of potassium sulfate and an aqueous solution of sodium sulfate.

In the above example, a nickel-cobalt-manganese metal composite hydroxide is produced; however, a nickel-cobalt-manganese metal composite oxide may be produced instead.

For preparing a composite oxide of nickel and the element X from a composite hydroxide of nickel and the element X, an oxidation step may be implemented to oxidize the hydroxide by calcination at a temperature of 300° C. or higher and 800° C. or lower for 1 hour or more and 10 hours or less.

For example, a nickel-cobalt-manganese composite oxide can be produced by calcinating a nickel-cobalt-manganese composite hydroxide. The calcination time is preferably 1 hour or more and 30 hours or less as a total time from starting to raise the temperature until the end of temperature holding. The heating rate in the heating step where the temperature reaches the highest holding temperature is preferably 180° C./hour or more, more preferably 200° C./hour or more, and particularly preferrably 250° C./hour or more.

In the present embodiment, the produced precursor may be pulverized.

The pulverization step is preferably carried out using an air flow type pulverizer, a collision type pulverizer equipped with a classification mechanism, a pin mill, a ball mill, a jet mill, a counter jet mill equipped with a classification rotor, or the like.

[(2) Mixing Step of Mixing Precursor and Lithium Compound to Obtain Mixture]

This step is a step of mixing a lithium compound and a nickel-containing metal composite compound as a precursor to obtain a mixture.

Lithium Compound

As the lithium compound used in the present invention, any of lithium carbonate, lithium nitrate, lithium acetate, lithium hydroxide, lithium oxide, lithium chloride and lithium fluoride may be used individually or in the form of a mixture of two or more of these lithium compounds. Among these, either one or both of lithium hydroxide and lithium carbonate are preferable.

When the lithium hydroxide contains lithium carbonate, the amount of lithium carbonate in the lithium hydroxide is preferably 5% by mass or less.

A method for mixing the precursor and the lithium compound is described below.

The precursor is dried and then mixed with the lithium compound. The drying conditions are not particularly limited, and examples thereof include any of the following drying conditions 1) to 3).

1) Conditions that do not allow the precursor to be oxidized or reduced. Specifically, this means drying conditions that allow the oxide to remain as an oxide, or the hydroxide to remain as a hydroxide.

2) Conditions that allow the precursor to be oxidized. Specifically, this means drying conditions that oxidize a hydroxide into an oxide.

3) Conditions that allow the precursor to be reduced. Specifically, this means drying conditions that reduce an oxide into hydroxide.

For providing the conditions that do not allow the precursor to be oxidized or reduced, an inert gas such as nitrogen, helium or argon may be used in the atmosphere for drying.

For providing the conditions that allow the hydroxide to be oxidized, oxygen or air may be used in the atmosphere for drying.

Further, for providing the conditions that allow the precursor to be reduced, a reducing agent such as hydrazine or sodium sulfite may be used in an inert gas atmosphere.

After drying the precursor, the resulting may be subjected to appropriate classification.

The aforementioned lithium compound and precursor are mixed in view of the composition ratio of the end product. For example, when using a nickel-cobalt-manganese metal composite hydroxide as the precursor, the lithium compound and the metal composite hydroxide are used in a proportion corresponding to the composition ratio of $Li[Li_r(Ni_s Co_tMn_u)_{1-r}]O_2$ (wherein s+t+u=1). By calcining a mixture of the nickel-cobalt-manganese metal composite hydroxide and the lithium compound, a lithium-nickel-cobalt-manganese metal composite oxide can be obtained.

In order to obtain a homogeneous lithium-nickel-cobalt-manganese metal composite oxide, r is preferably more than 0, more preferably 0.01 or more, and even more preferably 0.02 or more. In order to obtain a lithium-nickel-cobalt-manganese composite oxide with high purity, r is preferably 0.1 or less, more preferably 0.08 or less, and even more preferably 0.06 or less.

The upper limit values and lower limit values of r can be combined in any manner.

As for the combination of the upper limit values and the lower limit values of r, for example, r satisfies $0<r\leq0.1$, $0.01\leq r\leq0.08$ or $0.02\leq r\leq0.06$.

[(3) Step of Calcining Mixture to Obtain Raw Material Compound]

This step is a step of calcining the mixture of the lithium compound and the precursor to obtain a raw material compound.

The calcination may be carried out in dried air, an oxygen atmosphere, an inert atmosphere or the like depending on the desired composition, and may include multiple heating steps if necessary.

In the present embodiment, the calcination temperature to be adopted may be within a range of 200° C. to 1150° C. and is preferably within a range of 300° C. to 1050° C. and more preferably 500° C. to 1000° C. When the mixture is calcined in the presence of the inert melting agent described later, the calcination temperature may be decided in consideration of the melting point of the inert melting agent, and is preferably not lower than [melting point of the inert melting agent−200° C.] and not higher than [melting point of the inert melting agent+200° C.].

The calcination temperature in the context of the present specification means the temperature of the atmosphere in a calcination furnace, and is the maximum holding temperature in the main calcination step. The "maximum holding temperature in the main calcination step" may be simply referred to as "maximum holding temperature" in the following descriptions. When the main calcination step includes multiple heating sub-steps, the calcination temperature means the highest temperature among the maximum holding temperatures of the heating sub-steps.

By adjusting the holding temperature for the calcination, the average primary particle size and the BET specific surface area of the obtained raw material compound and the lithium metal composite oxide powder can be controlled within the preferable ranges of the present embodiment.

Generally, as the holding temperature increases, the primary particle diameter tends to increase, resulting in smaller BET specific surface area. The holding temperature in the calcination may be adjusted appropriately in view of the types of transition metal elements to be used, the types of precipitant and inert melting agent to be used, and the amount of the inert melting agent.

The calcination time is preferably 2 hours or more and 50 hours or less, and more preferably 3 hours or more and 50 hours or less. The calcination time exceeding 50 hours tends to result in substantially lower battery performance due to volatilization of lithium. The calcination time less than 2 hours tends to result in a poor crystal growth and an inferior battery performance. It is also effective to perform a precalcination in advance of the aforementioned calcination. The precalcination is preferably implemented at a temperature in the range of 300 to 850° C. for 1 to 10 hours.

In the present embodiment, the heating rate in the heating sub-step where the temperature reaches the highest holding temperature is preferably 180° C./hour or more, more preferably 200° C./hour or more, and particularly preferably 250° C./hour or more.

The heating rate in the heating sub-step where the temperature reaches the highest holding temperature is calculated from the time period from starting to raise the temperature until the temperature reaches the holding temperature described later.

By adjusting the holding time for the calcination, the average primary particle size and the BET specific surface area of the obtained raw material compound and the lithium metal composite oxide powder can be controlled within the preferable ranges of the present embodiment.

Generally, as the holding time increases, the primary particle diameter tends to increase, resulting in smaller BET specific surface area. The holding time for the calcination may be adjusted appropriately in view of the types of transition metal elements to be used, the types of precipitant and inert melting agent to be used, and the amount of the inert melting agent.

The calcination step preferably has multiple calcination sub-steps with different calcination temperatures. For example, it is preferable that the calcination step has a first calcination sub-step and a second calcination sub-step to be implemented at a higher temperature than the first calcination sub-step. Further, the calcination step may have calcination sub-steps with different calcination temperatures and different calcination times.

In the present embodiment, the raw material compound obtained by the calcination may be subjected to disintegration. When the raw material compound obtained by the calcination does not have a BET specific surface area within the preferable range, it is preferable to adjust the BET specific surface area by a disintegration step.

The disintegration step is preferably carried out using an air flow type pulverizer, a collision type pulverizer equipped with a classification mechanism, a pin mill, a ball mill, a jet mill, a counter jet mill equipped with a classification rotor, or the like. Particularly, when disintegration is implemented by a pin mill, aggregation between primary particles can be broken.

As described above, the raw material compound can be obtained by calcining the mixture of the lithium compound and the nickel-containing metal composite compound which is a precursor.

[(4) Step of Mixing Raw Material Compound and Compound Containing Element M to Obtain Lithium Metal Composite Oxide Powder]

The lithium metal composite oxide powder of the present embodiment can be obtained by mixing the raw material compound obtained in the calcination step described above with the compound containing the element M, and heat-treating the resulting mixture.

The compound containing the element M preferably contains a compound containing at least one element selected from the group consisting of Al. B, Si, S, Nb, F and P. The compound containing the element M is not particularly limited, and any of oxides, hydroxides, carbonates, nitrates, sulfates, halides, oxalates and alkoxides, each containing the element M, can be used, among which the oxides are preferable.

Examples of the compound containing the element M include $H_2SO_3$, $H_2S_2O_3$, $H_2SO_6$, $H_2SO_8$, $H_3PO_4$, $H_4P_2O_7$, $H_3PO_3$, $H_3PO_2$, $B_2O_3$, $H_3BO_3$, $HBO_2$, $H_2B_4O_7$, and $HB_5O_8$.

The method for mixing the raw material compound and the compound containing the element M is not particularly limited. For example, it is possible to adopt a method in which powders of the raw material compound and the compound containing the element M are mixed together using a powder mixer having a stirring blade inside. Alternatively, it is also possible to adopt a method in which a liquid in which the compound containing the element M is dissolved or dispersed in water or the like is sprayed onto the raw material compound powder. It is preferable to adopt a mixing method using a mixing device that does not include a mixing medium such as balls and does not involve strong pulverization.

The heat treatment conditions in the heat treatment implemented after mixing the raw material compound and the compound containing the element M may vary depending on the type of the compound containing the element M. Examples of the heat treatment conditions include a heat treatment temperature and a holding time during the heat treatment.

The heat treatment temperature is preferably set in the range of 300° C. or higher and 700° C. or lower, more preferably 300° C. or higher and 600° C. or lower, and even more preferably 300° C. or higher and 500° C. or lower.

Further, the holding time is preferably 1 hour or more and 10 hours or less, more preferably 2 hours or more and 9 hours or less, and even more preferably 3 hours or more and 8 hours or less.

By regulating the heat treatment conditions, the concentration of the element M in the coatings can be adjusted within a preferable range, the coatings can imparted with an amorphous structure, and the BET specific surface area of the lithium metal composite oxide powder can be adjusted within a preferable range.

As the atmosphere for the heat treatment, a dry air, an oxygen atmosphere or an inert atmosphere can be adopted as in the case of calcination in the step of obtaining the raw material compound.

The mixing amount of the compound containing the element M is not particularly limited. For example, the compound containing the element M may be mixed in an amount such that the ratio of the element M ranges from more than 0 mol % to 5 mol %, preferably 0.01 mol % to 5 mol %, based on the total amount of the raw material compound (100 mol %) obtained in the step described above. In this context, the "total amount of the raw material compound" indicates a sum of amounts, in terms of amount of substance, of Ni and the element X.

By adjusting the mixing amount of the compound containing the element M, the ratio of the element M to the sum of amounts of Ni and the element M (M/(Ni+X)) and the concentration of the element M in the coatings can be adjusted to fall within respective preferable ranges.

The lithium metal composite oxide powder of the present embodiment can also be obtained by forming a coating containing the element M on the surface of the raw material compound by a method such as sputtering, CVD or vapor deposition.

Alternatively, the lithium metal composite oxide powder of the present embodiment may be obtained by mixing or calcining the metal composite oxide or hydroxide with a lithium salt and the compound containing the element M.

The lithium metal composite oxide powder may be subjected to appropriate disintegration or classification.

[Optional Step]

In the present embodiment, it is preferable to wash the dried lithium metal composite oxide powder using pure water, an alkaline washing liquid or the like as a washing liquid.

Examples of the alkaline washing liquid include aqueous solutions of anhydrides of at least one compound selected from the group consisting of LIOH (lithium hydroxide), NaOH (sodium hydroxide), KOH (potassium hydroxide). $Li_2CO_3$ (lithium carbonate). $Na_2CO_3$ (sodium carbonate), $K_2CO_3$ (potassium carbonate), and $(NH_4)CO$ (ammonium carbonate), as well as aqueous solutions of hydrates of the anhydrides described above Ammonia can also be used as an alkali component of the alkaline washing liquid.

With regard to the method for bringing the washing liquid into contact with the lithium metal composite oxide powder in the washing step, examples thereof include a method that involves putting the lithium metal composite oxide powder into the washing liquid, followed by stirring, and a method that involves showering the washing liquid over the lithium metal composite oxide powder. Further examples of the method for bringing the washing liquid into contact with the lithium metal composite oxide powder include a method that involves: putting the lithium metal composite oxide powder into the washing liquid, followed by stirring; separating the lithium metal composite oxide powder from the washing liquid; and showering the washing liquid over the separated lithium metal composite oxide powder.

The temperature of the washing liquid used for washing is preferably 15° C. or lower, more preferably 10° C. or lower, and even more preferably 8° C. or lower. By adjusting the temperature of the washing liquid to a temperature that does not allow the washing liquid to freeze within the above range, it is possible to suppress excessive elution of lithium ions from the crystal structure of the lithium metal composite oxide powder into the w ashing liquid during w ashing.

In the present embodiment, a mixture of the lithium compound and the nickel-containing metal composite compound as a precursor may be calcined in the presence of an inert melting agent.

The calcination of the mixture in the presence of an inert melting agent can facilitate the reaction of the mixture. The inert melting agent may be allowed to remain in the lithium metal composite oxide powder after calcination, or may be removed by washing with a washing liquid after calcination. In the present embodiment, it is preferable to wash the calcined lithium metal composite oxide powder using a washing liquid such as pure water, an alkaline washing liquid or the like.

In the present embodiment, even when the inert melting agent is added in the mixing step, the calcination temperature and the total time may be appropriately adjusted within the above ranges.

The inert melting agent that can be used in the present embodiment is not particularly limited as long as the inert melting agent is a compound that is not likely to react with the mixture during the calcination. In the present embodiment, the inert melting agent may be at least one selected from the group consisting of fluoride, chloride, carbonate, sulfate, nitrate, phosphate, hydroxide, molybdate, and tungstate of at least one element (hereinafter referred to as "A") selected from the group consisting of Na, K, Rb, Cs, Ca, Mg, Sr and Ba.

Examples of the fluoride of A include NaF (melting point: 993° C.), KF (melting point: 858° C.), RbF (melting point: 795° C.), CsF (melting point: 682° C.), $CaF_2$ (melting point: 1402° C.), $MgF_2$ (melting point: 1263° C.), SrF, (melting point: 1473° C.), and $BaF_2$ (melting point: 1355° C.)

Examples of the chloride of A include NaCl (melting point: 801° C.), KCl (melting point: 770° C.), RbCl (melting point 718° C.), CsCl (melting point: 645° C.), $CaCl_2$ (melting point 782° C.), $MgCl_2$ (melting point: 714° C.), $SrCl_2$ (melting point: 857° C.), and $BaCl_2$ (melting point 963° C.).

Examples of the carbonate of A include $Na_2CO_3$ (melting point: 854° C.), $K_2CO$; (melting point: 899° C.), $Rb_2CO$; (melting point: 837° C.), $Cs_2CO_3$ (melting point: 793° C.), $CaCO_3$ (melting point 825° C.), $MgCO_3$ (melting point 990° C.), $SrCO_3$ (melting point 1497° C.), and $BaCO_3$ (melting point 1380° C.).

Examples of the sulfate of A include $Na_2SO_4$ (melting point: 884° C.), $K_2SO_4$ (melting point: 1069° C.), $Rb_2SO_4$ (melting point: 1066° C.), $Cs_2SO_4$ (melting point 1005° C.), $CaSO_4$ (melting point: 1460° C.), $MgSO_4$ (melting point: 1137° C.), $SrSO_4$ (melting point: 1605° C.) and $BaSO_4$ (melting point: 1580° C.).

Examples of the nitrate of A include $NaNO_3$ (melting point: 310° C.), $KNO_3$ (melting point: 337° C.), $RbNO_3$ (melting point: 316° C.), $CsNO_3$ (melting point: 417° C.), $Ca(NO_3)_2$ (melting point: 561° C.), $Mg(NO_3)_2$, $Sr(NO_3)_2$ (melting point: 645° C.), and $Ba(NO_3)_2$ (melting point: 596° C.).

Examples of the phosphate of A include $Na_2PO_4$, $K_3PO_4$ (melting point: 1340° C.), $Rb_3PO_4$, $Cs_3PO_4$, $Ca_3(PO_4)$, $Mg_3(PO_4)_2$ (melting point: 1184° C.), $Sr_3(PO_4)_2$ (melting point: 1727° C.), and $Ba(PO_4)$ (melting point: 1767° C.).

Examples of the hydroxide of A include NaOH (melting point: 318° C.), KOH (melting point: 360° C.), RbOH (melting point: 301° C.), CsOH (melting point: 272° C.), $Ca(OH)_2$ (melting point: 408° C.), $Mg(OH)_2$ (melting point: 350° C.), $Sr(OH)_2$ (melting point: 375° C.), and $Ba(OH)_2$ (melting point: 853° C.)

Examples of the molybdate of A include $Na_2MoO_4$ (melting point: 698° C.), $K_2MoO_4$ (melting point 919° C.), $Rb_2MoO_4$ (melting point: 958° C.), $Cs_2MoO_4$ (melting point 956° C.), $CaMoO_4$ (melting point: 1520° C.), $MgMoO_4$ (melting point: 1060° C.), $SrMoO_4$ (melting point: 1040° C.), and $BaMoO_4$ (melting point 1460° C.).

Examples of the tungstate of A include $Na_2WO_4$ (melting point: 687° C.), $K_2WO_4$, $Rb_2WO_4$, $Cs_2WO4$, $CaWO_4$, $MgWO_4$, $SrWO_4$, and $BaWO_4$.

In the present embodiment, two or more of these inert melting agents may be used. When two or more inert melting agents are used, the melting point may be lowered. Further, among these inert melting agents, for obtaining a lithium metal composite oxide powder with higher crystallinity, it is preferable to use any one or combination of the carbonate and sulfate of A and the chloride of A. Further. A is preferably one or both of sodium (Na) and potassium (K). That is, among the above, the inert melting agent is particularly preferably one or more selected from the group consisting of NaOH KOH, NaCl, KCl, $Na_2CO_3$, $K_2CO_3$, $Na_2SO_4$, and K₂SO4.

In the present embodiment, potassium sulfate or potassium carbonate is preferable as the inert melting agent.

In the present embodiment, even when the inert melting agent is added in the mixing step, the w ashing may be appropriately adjusted within the above ranges.

The lithium metal composite oxide powder obtained by calcination is appropriately pulverized and classified to obtain a positive electrode active material applicable to lithium secondary batteries.

The positive electrode active material (for a lithium secondary battery) of the present embodiment may contain a lithium metal composite oxide powder different from the lithium metal composite oxide powder of the present embodiment.

The positive electrode active material (for a lithium secondary battery) of the present embodiment contains the lithium metal composite oxide powder of the present embodiment in an amount of, preferably, 70% by mass or more and 99% by mass or less, and more preferably 80% by mass or more and 98% by mass or less, based on the total mass (100% by mass) of the positive electrode active material for a lithium secondary battery.

<Lithium Secondary Battery>

Next, the configuration of a lithium secondary battery for which the positive electrode active material of the present embodiment can be suitably used is described below.

Further, a positive electrode for which the positive electrode active material (for a lithium secondary battery) containing the positive electrode active material powder of the present embodiment can be suitably used is also described below.

Furthermore, a lithium secondary battery for which the positive electrode can be suitably used is also described below.

In one example of the lithium secondary battery for which the positive electrode active material of the present embodiment can be suitably used, the lithium secondary battery includes a positive electrode, a negative electrode, a separator interposed between the positive electrode and the negative electrode, and an electrolytic solution disposed between the positive electrode and the negative electrode.

Figure 1B:
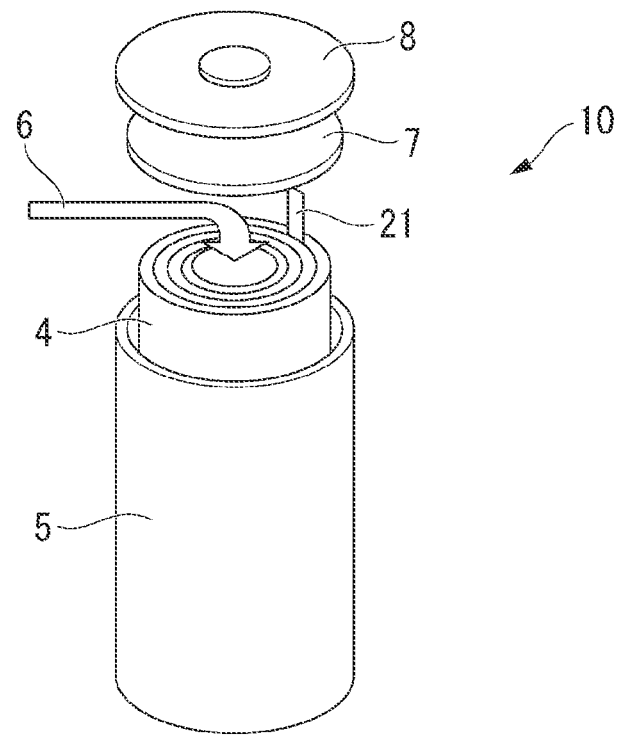
FIG. 1B is a schematic diagram showing one example of a lithium secondary battery.

Each of FIG. 1A and FIG. 1B is a schematic view illustrating an example of the lithium secondary battery of the present embodiment. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound into an electrode group 4.

Next, as illustrated in FIG. 1B, the electrode group 4 and an insulator (not shown) are placed in a battery can 5, followed by sealing the bottom of the can, and then an electrolytic solution 6 is impregnated into the electrode group 4 such that an electrolyte is disposed between the positive electrode 2 and the negative electrode 3. Further, the top section of the battery can 5 is sealed using a top insulator 7 and a sealing body 8, whereby the lithium secondary battery 10 can be obtained.

With regard to the shape of the electrode group 4, the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086, which is the standard of batteries prescribed by the International Electrotechnical Commission (IEC), or JIS C 8500 Examples thereof include a cylindrical shape, an angular shape, etc.

The lithium secondary battery is not limited to the wound configuration as described above, and may have a laminated configuration obtained by laminating a positive electrode, a separator, a negative electrode, a separator, and so forth. Examples of the laminated lithium secondary battery include the so-called coin-type battery, button-type batter, and paper-type (or sheet-type) battery.

Hereinbelow, the respective components are described.

(Positive Electrode)

The positive electrode can be manufactured by, first, preparing a positive electrode mix including the aforementioned positive electrode active material, a conductive material and a binder, and causing the positive electrode mix to be supported on a positive electrode current collector.

(Conductive Material)

As the conductive material included in the positive electrode, a carbonaceous material can be used. Examples of the carbonaceous material include a graphite powder, a carbon black (such as acetylene black) and a fibrous carbonaceous material. Since carbon black is in the form of microparticles and has a large surface area, the addition of only a small amount of the carbon black to the positive electrode mix increases the conductivity within the positive electrode, and improves the charge/discharge efficiency and the output performance as well; however, too large an amount of carbon black deteriorates the binding strength of the binder exerted not only between the positive electrode mix and the positive electrode current collector but also within the positive electrode mix, thereby becoming an adverse factor that increases an internal resistance.

The amount of the conductive material in the positive electrode mix is preferably parts by mass or more and 20 parts by mass or less, relative to 100 parts by mass of the positive electrode active material. This amount may be decreased when using a fibrous carbonaceous material such as a graphitized carbon fiber or a carbon nanotube as the conductive material.

(Binder)

As the binder included in the positive electrode active material, a thermoplastic resin can be used. Examples of the thermoplastic resin include fluororesins such as polyvinylidene fluoride (hereinafter also referred to as PVdF) polytetrafluoroethylene (hereinafter also referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in the form of a mixture thereof. When a fluororesin and a polyolefin resin are used as the binder, it is possible to obtain a positive electrode mix capable of strong adhesive force relative to the positive electrode current collector as well as strong biding force within the positive electrode mix in itself by adjusting the ratio of the fluororesin to fall within the range of from 1% by mass to 10% by mass, and the ratio of the polyolefin resin to fall within the range of from 0.1% by mass to 2% by mass, based on the total mass of the positive electrode mix.

(Positive Electrode Current Collector)

As the positive electrode current collector included in the positive electrode, it is possible to use a strip-shaped member composed of a metal material such as Al, Ni, or stainless steel as a component material. It is especially preferred to use a current collector which is made of Al and is shaped into a thin film because of its high processability and low cost.

Examples of the method for causing the positive electrode mix to be supported on the positive electrode current collector include a method in which the positive electrode mix is press-formed on the positive electrode current collector. Alternatively, the positive electrode mix may be caused to be supported on the positive electrode current collector by a method that involves producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that can be used for producing the paste from the positive electrode mix include amine-based solvents such as N,N-dimethylaminopropylamine and diethylene triamine: ether-based solvents such as tetrahydrofuran, ketone-based solvents such as methyl ethyl ketone: ester-based solvents such as methyl acetate, and amide-based solvents such as dimethyl acetamide, and N-methyl-2-pyrrolidone (hereinafter, also referred to as "NMP").

Examples of the method for applying the paste of the positive electrode mix to the positive electrode current collector include a slit die coating method, a screen coating method, a curtain coating method, a knife coating method, a gravure coating method, and an electrostatic spray method.

The positive electrode can be produced by the method as described above (Negative Electrode)

The negative electrode included in the lithium secondary battery of the present embodiment is not particularly limited as long as it is capable of doping and de-doping lithium ions at a potential lower than the positive electrode, and examples thereof include an electrode including a negative electrode current collector having supported thereon a negative electrode mix including a negative electrode active material, and an electrode constituted solely of a negative electrode active material.

(Negative Electrode Active Material)

Examples of the negative electrode active material included in the negative electrode include carbonaceous materials, chalcogen compounds (oxides, sulfides, etc.), nitrides, metals or alloys, which allow lithium ions to be doped or de-doped at a potential lower than the positive electrode.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is an positive integer) such as $SiO_2$ and SiO; oxides of titanium represented by the formula: $TiO_x$ (wherein x is an positive integer) such as $TiO_2$ and TiO; oxides of vanadium represented by the formula $VO_x$ (wherein x is an positive integer) such as $V_2O_5$ and $VO_2$; oxides of iron represented by the formula $FeO_x$ (wherein x is an positive integer) such as $Fe_3O_4$, $Fe_2O_3$ and FeO; oxides of tin represented by the formula: $SnO_x$ (wherein x is an positive integer) such as $SnO_2$ and SnO; oxides of tungsten represented by the formula: $WO_x$ (wherein x is an positive integer) such as $WO_3$ and $WO_2$; and metal composite oxides containing lithium and titanium or vanadium such as $Li_4Ti_5O_2$ and $LiVO_2$.

Examples of sulfides that can be used as the negative electrode active material include sulfides of titanium represented by the formula: $TiS_x$ (wherein x is an positive integer) such as $Ti_2S_3$, $TiS_2$ and TiS; sulfides of vanadium represented by the formula $VS_x$ (wherein x is an positive integer) such as $V_3S_4$, $VS_2$, and VS; sulfides of iron represented by the formula: $FeS_x$ (wherein x is an positive integer) such as $Fe_3S_3$, $FeS_2$ and FeS; sulfides of molybdenum represented by the formula: $MoS_x$ (wherein x is an positive integer) such as $Mo_2S_3$ and $MoS_2$; sulfides of tin represented by the formula: $SnS_x$ (wherein x is an positive integer) such as $SnS_2$ and SnS; sulfides of tungsten represented by the formula $WS_x$ (wherein x is an positive integer) such as $WS_2$, sulfides of antimony represented by the formula: $SbS_x$ (wherein x is an positive integer) such as $Sb_2S_3$; and sulfides of selenium represented by the formula: $SeS_x$ (wherein x is an positive integer) such as $Se_5S_3$, $SeS_2$ and SeS.

Examples of nitrides that can be used as the negative electrode active material include lithium-containing nitrides such as $Li_3N$ and $Li_{3-x}A_xN$ (wherein A is one or both of Ni and Co, and 0<x<3).

Each of the aforementioned carbonaceous materials, oxides, sulfides and nitrides may, be used alone or in combination. Further, each of the aforementioned carbonaceous materials, oxides, sulfides and nitrides may be crystalline or amorphous.

Examples of metals that can be used as the negative electrode active material include lithium metals, silicon metals, tin metals, etc.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La, and other alloys such as $Cu_2Sb$ and $La_3Ni_2Sn_2$.

The metals or alloys are processed into, for example, a foil, and are in many cases used alone as an electrode.

Among the aforementioned negative electrode active materials, carbonaceous materials composed mainly of graphite such as natural graphite or artificial graphite are preferably used for reasons such as follow's: the potential of the negative electrode hardly changes during charging from an uncharged state to a fully charged state (the potential flatness is favorable), the average discharge potential is low, the capacity retention after repeated charge/discharge cycles is high (the cycle performance is favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may contain a binder in order to integrate the components of the negative electrode mix and facilitate molding. As the binder, a thermoplastic resin can be used, and examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent etc., is applied to and dried on the negative electrode current collector, and the resulting is press-bonded to the current collector.

(Separator)

As the separator used in the lithium secondary battery, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials mentioned above, or may be formed by laminating these materials.

For satisfaction permeation of the electrolyte through the separator during the use (charge and discharge) of the battery, the separator preferably has an air resistance of 50 sec/100 cc to 300 sec/100 cc, more preferably 50 sec/100 cc to 200 sec/100 cc as measured by Gurley method prescribed in JIS P 8117.

The porosity of the separator is preferably 30% by volume to 80% by volume, and more preferably 40% by volume to 70% by volume. The separator may be a laminate of separators having different porosities.

(Electrolytic Solution)

The electrolytic solution used in the lithium secondary battery contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2CF_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein "BOB" means bis(oxalato)borate), LiFSI (wherein FSI means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing compound selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)$;

As the organic solvent included in the electrolyte, it is possible to use, for example, a carbonate such as propylene carbonate, ethylene carbonate, dimethyl carbonate, diethyl carbonate, ethyl methyl carbonate, 4-trifluoromethyl-1,3-dioxolane-2-one, and 1.2-di(methoxycarbonyloxy)ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and γ-butyrolactone; a nitrile such as acetonitrile and butyronitrile; an amide such as N,N-dimethyl formamide and N,N-dimethylacetoamide; a carbamate such as 3-methyl-2-oxazolidone, a sulfur-containing compound such as sulfolane, dimethyl sulfoxide, and 1,3-propane sultone; or a solvent produced by further introducing a fluoro group into the above-described organic solvent (a compound in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after charge/discharge at a high current rate, a low tendency of deterioration even when used for a long period of time, and a lowk decomposability even when a graphite material such as natural graphite or artificial graphite is used as the active material for the negative electrode.

For improving the stability of the obtained lithium secondary battery, it is preferable to use an electrolytic solution including a lithium salt containing fluorine such as $LiPF_6$ and an organic solvent having a fluorine substituent. A solvent mixture including an ether having a fluorine substituent such as pentafluoropropyl methyl ether or 2,2,3,3-tetrafluoropropyl difluoromethyl ether and dimethyl carbonate is more preferable since a high capacity retention is achievable even when the battery is charged and discharged at a high current rate.

A solid electrolyte described below may be used instead of the aforementioned electrolytic solution. In some cases, the use of a solid electrolyte may further improve the safety of the lithium secondary battery.

In the lithium secondary battery, the solid electrolyte, when used, may serve as a separator. In such a case, the separator may be omitted.

<All-Solid-State Lithium Battery>

Next, explanations are given about a positive electrode using the lithium metal composite oxide powder according to one aspect of the present invention as the positive electrode active material of an all-solid-state lithium secondary battery, as well as about an all-solid-state lithium secondary battery having the positive electrode, while explaining the configuration of the all-solid-state lithium secondary battery.

Figure 2:
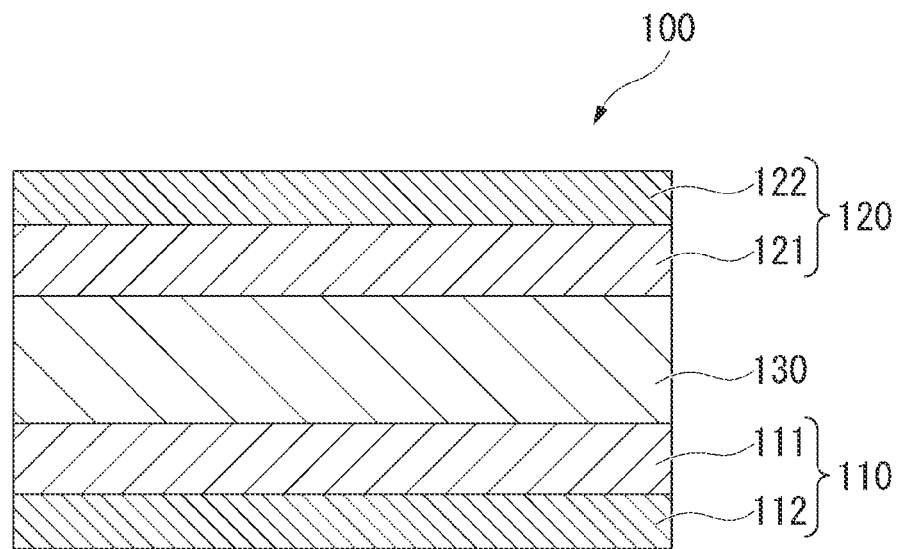
FIG. 2 is a schematic diagram showing a laminate included in the all-solid-state lithium battery of the present embodiment.
Figure 3:
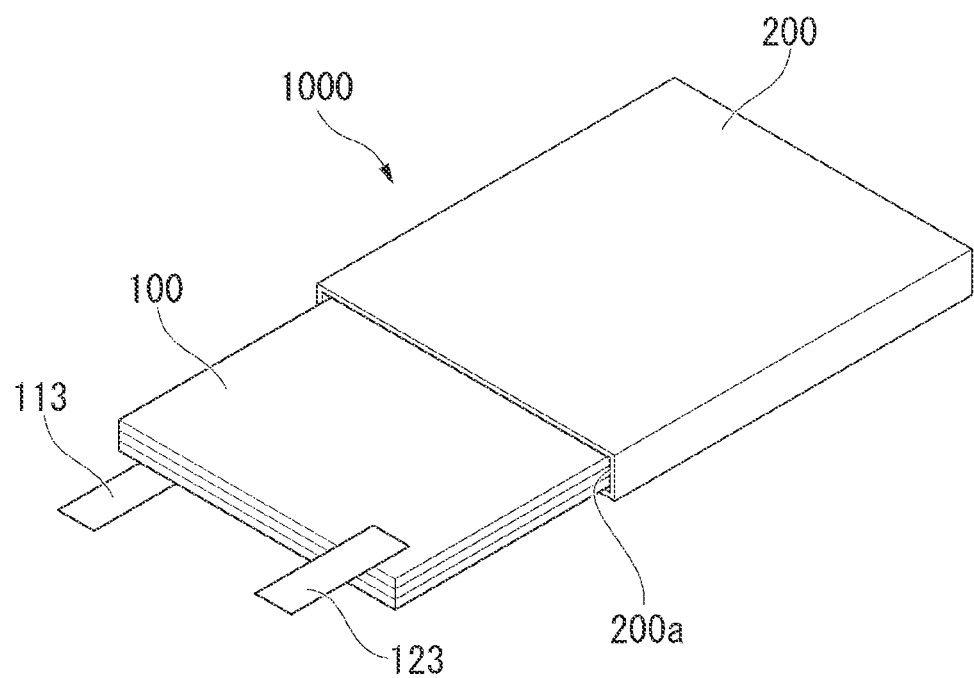
FIG. 3 is a schematic diagram showing an overall configuration of the all-solid-state lithium battery of the present embodiment.

FIGS. 2 and 3 are schematic diagrams illustrating an example of the all-solid-state lithium battery in the present embodiment. The all-solid-state lithium battery 1000 shown in FIGS. 2 and 3 includes: a laminate 100 having a positive electrode 10o, a negative electrode 120, and a solid electrolyte layer 130; and an exterior body 200 configured to accommodate the laminate 100. Material forming each member will be described later.

The laminate 100 may include an external terminal 113 connected to a positive electrode current collector 112 and an external terminal 123 connected to a negative electrode current collector 122. In addition, the all-solid-state lithium secondary battery 1000 may have a separator between the positive electrode 110 and the negative electrode 120.

The all-solid-state lithium battery 1000 further includes an insulator (not shown) configured to insulate between the laminate 100 and the exterior body 200 and a sealing body (not shown) configured to seal an opening 200a of the exterior body 200.

As the exterior body 200, a container formed of a highly corrosion-resistant metal material such as aluminum, stainless steel, and nickel-plated steel can be used. Furthermore, as the exterior body 200, it is also possible to use a container obtained by processing a laminate film which has at least one surface thereof made corrosion-resistant and has been processed into a bag shape.

With regard to the shape of the all-solid-state lithium secondary battery 1000, for example, the battery 1000 may be of a coin type, a button type, a paper type (or a sheet type), a cylindrical type, a square type, or a laminated type (pouch type).

The all-solid-state lithium secondary battery 1000 is illustrated as having one laminate 100 as an example, but the present embodiment is not limited to this example.

The all-solid-state lithium battery 1000 may have a configuration in which, using the laminate 100 as a unit cell, multiple unit cells (multiple laminates 100) are sealed inside the exterior body 200.

Hereinbelow, the respective components are described.
(Positive Electrode)

The positive electrode 110 in this embodiment has a positive electrode active material layer 11 and the positive electrode current collector 112.

The positive electrode active material layer 111 includes the positive electrode active material provided in one aspect of the present invention described above, and a solid electrolyte. Further, the positive electrode active material layer 11 may include a conductive material, and a binder.
(Solid Electrolyte)

As a solid electrolyte included in the positive electrode active material layer 11 in the present embodiment, a solid electrolyte having lithium ion conductivity and used for known all-solid-state batteries can be employed. Examples of such a solid electrolyte include inorganic electrolytes and organic electrolytes Examples of the inorganic electrolytes include oxide-based solid electrolytes, sulfide-based solid electrolytes, and hydride-based solid electrolytes Examples of the organic electrolytes include polymer-based solid electrolytes.
(Oxide-Based Solid Electrolyte)

Examples of the oxide-based solid electrolytes include perovskite type oxides, NASICON type oxides, LISICON type oxides, garnet type oxides, and the like.

Examples of the perovskite type oxides include Li—La—Ti-based oxides such as $Li_aLa_{1-a}TiO_3$ (0<a<1), Li—La—Ta-based oxides such as $Li_bLa_{1-b}TaO_3$ (0<b<1), Li—La—Nb-based oxides such as $Li_cLa_{1-c}NbO_3$ (0<c<1), and the like.

Examples of the NASICON type oxides include $Li_{1+d}Al_dTi_{2-d}(PO_4)_3$ (0≤d≤1) and the like. The NASICON type oxide is an oxide represented by $Li_cM^1{}_fM^2{}_gP_hO_i$, wherein $M^1$ is at least one element selected from the group consisting of B, Al, Ga, In, C, Si, Ge, Sn, and Sb, $M^2$ is at least one element selected from the group consisting of Ti, Zr, Ge, In, Ga, Sn, and Al. and e, f g, h and i are arbitrary positive numbers.

Examples of the LISICON type oxide include oxides represented by $Li_4M^3O_4$—$Li_3M^4O_4$, wherein $M^3$ is at least one element selected from the group consisting of Si, Ge, and Ti, and $M^4$ is at least one element selected from the group consisting of P, As, and V.

Examples of the garnet type oxides include Li—La—Zr-based oxides such as $Li_7La_3Zr_2O_{12}$ (also referred to as "LLZ").

The oxide-based solid electrolytes may be crystalline materials or amorphous materials.

(Sulfide-Based Solid Electrolyte)

Examples of the sulfide-based solid electrolytes include $Li_2S$—$P_2S_5$-based compounds. $Li_2S$—$SiS_2$-based compounds, $Li_2S$—$GeS_2$-based compounds, $Li_2S$—$B_2S_3$-based compounds, $Li_2S$—$P_2S_3$-based compounds, LiI—$Si_2S$—$P_2S_5$, LiI—$Li_2S$—$P_2O_5$, LiI—$Li_3PO_4$—$P_2S_5$, and $Li_{10}GeP_2S_{12}$.

In the context of the specification, the expression including "-based compounds" for indicating sulfide-based solid electrolytes is used as a generic term for solid electrolytes comprised mainly of raw materials such as "$Li_2S$" and "$P_2S_5$", the names of which precede "-based compounds." For example, $Li_2S$—$P_2S_5$-based compounds include solid electrolytes comprised mainly of $Li_2S$ and $P_2S_5$ and further containing other raw materials. The proportion of $Li_2S$ contained in $Li_2S$—$P_2S_5$-based compound is, for example, 50 to 90% by mass, based on the total mass of the $Li_2S$—$P_2S_5$-based compound. The proportion of $P_2S_5$ contained in $Li_2S$—$P_2S_5$-based compound is, for example, 10 to 50% by mass, based on the total mass of the $Li_2S$—$P_2S_5$-based compound. The proportion of other raw material(s) contained in the $Li_2S$—$P_2S_5$-based compound is, for example, 0 to 30% by mass, based on the total mass of the $Li_2S$—$P_2S_5$-based compound. Furthermore, the $Li_2S$—$P_2S_5$-based compounds also include solid electrolytes having different mixing ratio of $Li_2S$ and $P_2S_5$.

Examples of the $Li_2S$—$P_2S_5$-based compounds include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2$—LiI, and $Li_2S$—$P_2S_5$—$Z_mS_n$, (with the proviso that m and n are positive numbers, and Z is Ge, Zn, or Ga), and the like.

Examples of the $Li_2S$—$SiS_2$-based compounds include $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$SiS_2$—$Li_3PO_4$, $Li_2S$—$SiS_2$—$Li_2SO_4$, and $Li_2S$—$SiS_2$-$Li_xMO_y$, (with the proviso that x and v are positive numbers, and M is P, Si, Ge, B, Al, Ga or In).

Examples of the $Li_2S$—$GeS_2$-based compounds include $Li_2S$—$GeS_2$ and $Li_2S$—$GeS_2$—$P_2S_5$, and the like.

The sulfide-based solid electrolyte may be a crystalline material or an amorphous material.
(Hydride-Based Solid Electrolyte)

Examples of materials for the hydride-based solid electrolytes include $LiBH_4$, $LiBH_4$-3KI, $LiBI_4$—$PI_2$, $LiBH_4$—$P_2S_5$, $LiBH_4$—$LiNH_2$, $3LiBH_4$—LiI, $LiNH_2$, $Li_2AlH_6$, $Li(NH_2)_2I$, $Li_2NH$, $LiGd(BH_4)_3Cl$, $Li_2(BH_4)(NH_2)$, $Li(NH_2)I$, $Li_4(BH_4)(NH_2)_3$, and the like.
(Polymer-Based Solid Electrolyte)

Examples of the polymer-based solid electrolytes include organic-based polymer electrolytes such as polyethylene-oxide-based polymer compounds and polymer compounds containing one or more selected from the group consisting of polyorganosiloxane chains and polyoxyalkylene chains. It is also possible to use the so-called gel-type solid electrolyte including a polymer retaining therein a non-aqueous electrolytic solution.

Two or more solid electrolytes can be used together as long as the effects of the present invention are not impaired.
(Conductive Material)

As a conductive material included in the positive electrode active material layer 111 in the present embodiment, at least one of carbonaceous materials and metal compounds can be used. Examples of the carbonaceous material include a graphite powder, a carbon black (such as acetylene black) and a fibrous carbonaceous material. Since the carbon black is in the form of fine particles and has a large surface area, the carbon black added in an appropriate amount (described below) to the positive electrode active material layer 111 can increase the conductivity inside the positive electrode 110 and improve charge and discharge efficiency and output performance. On the other hand, the carbon black added in an excessive amount decreases both of the binding force between the positive electrode active material layer 111 and the positive electrode collector 112 and the binding force inside the positive electrode active material layer 111, which causes an increase in internal resistance. Examples of the metal compound include metals, metal alloys, and metal oxides which have electrical conductivity.

In the case of the carbonaceous material, the amount of the conductive material in the positive electrode active material layer 111 is preferably 5 parts by mass or more and 20 parts by mass or less with respect to 100 parts by mass of the positive electrode active material. This amount may be decreased when using a fibrous carbonaceous material such as a graphitized carbon fiber or a carbon nanotube as the conductive material (Binder)

When the positive electrode active material layer 111 has a binder, thermoplastic resins can be used as the binder. Examples of the thermoplastic resin include polyimide resins: fluororesins such as polyvinylidene fluoride (hereinafter also referred to as PVdF), polytetrafluoroethylene (hereinafter also referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers, and polyolefin resins such as polyethylene and polypropylene.

Two or more of these thermoplastic resins may be used in the form of a mixture thereof. When a fluororesin and a polyolefin resin are used as binders while adjusting the proportion of the fluororesin in the entire positive electrode active material layer 111 to 1% by mass or more and 10% by mass or less, and the proportion of the polyolefin resin in the entire positive electrode active material laser 111 to 0.1% by mass or more and 2% by mass or less, the positive electrode active material layer 111 shows a high adhesive force between the positive electrode active material layer 111 and the positive electrode current collector 112 and a high binding force inside the positive electrode active material layer 111.

(Positive Electrode Current Collector)

As the positive electrode current collector 112 included in the positive electrode 110 of the present embodiment, it is possible to use a strip-shaped member composed of a metal material such as Al, Ni, or stainless steel as a component material. It is especially preferable to use a current collector which is made of Al and is shaped into a thin film because of its high processability and low cost.

Examples of the method for causing the positive electrode active material layer 111 to be supported on the positive electrode current collector 112 include a method in which the positive electrode active material layer 111 is press-formed on the positive electrode current collector 112. A cold press or a hot press can be used for the press forming.

Alternatively, the positive electrode active material layer 111 may be caused to be supported on the positive electrode current collector 112 by a method that involves: producing a positive electrode mix in the form of a paste from a mixture of a positive electrode active material, a solid electrolyte, a conductive material and a binder using an organic solvent; applying the obtained positive electrode mix to at least one surface of the positive electrode current collector 112, followed by drying; and press-bonding the resulting dried product to the positive electrode current collector 112.

Alternatively, the positive electrode active material layer 111 may be caused to be supported on the positive electrode current collector 112 by a method that involves: producing a positive electrode mix in the form of a paste from a mixture of a positive electrode active material, a solid electrolyte and a conductive material using an organic solvent; applying the obtained positive electrode mix to at least one surface of the positive electrode current collector 112, followed by drying; and sintering the resulting dried product.

Examples of the organic solvent that can be used for the positive electrode mix include amine-based solvents such as N,N-dimethylaminopropylamine and diethylene triamine, ether-based solvents such as tetrahydrofuran; ketone-based solvents such as methyl ethyl ketone; ester-based solvents such as methyl acetate; and amide-based solvents such as dimethyl acetamide, and N-methyl-2-pyrrolidone (hereinafter, sometimes also referred to as "NMP").

Examples of a method for applying the positive electrode mix on the positive electrode collector 112 include a slit die coating method, a screen coating method, a curtain coating method, a knife coating method, a gravure coating method, and an electrostatic spray method.

It is possible to manufacture the positive electrode 110 through the method described above.

(Negative Electrode)

The negative electrode 120 includes a negative electrode active material layer 121 and the negative electrode current collector 122. The negative electrode active material layer 121 contains a negative electrode active material. Furthermore, the negative electrode active material layer 121 may contain a solid electrolyte and a conductive material. As the solid electrolyte, the conductive material, and the binder, those described above can be used.

(Negative Electrode Active Material)

Examples of the negative electrode active material included in the negative electrode active material layer 121 include materials which are carbonaceous materials, chalcogen compounds (oxides, sulfides, etc.), nitrides, metals or alloys, and allow lithium ions to be doped or de-doped at a potential lower than the positive electrode 110.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is an positive integer) such as $SiO_2$ and SiO; oxides of titanium represented by the formula: $TiO_x$ (wherein x is an positive integer) such as $TiO_2$ and TiO; oxides of vanadium represented by the formula: $VO_x$ (wherein x is an positive integer) such as $V_2O_5$ and $VO_2$, oxides of iron represented by the formula: $FeO_x$ (wherein x is an positive integer) such as $Fe_3O_4$, $Fe_2O_3$ and FeO; oxides of tin represented by the formula: $SnO_x$ (wherein x is an positive integer) such as $SnO_2$ and SnO, oxides of tungsten represented by the formula: $WO_x$ (wherein x is an positive integer) such as $WO_3$ and $WO_2$; and metal composite oxides containing lithium and titanium or vanadium such as $Li_4Ti_5O_{12}$ and $LiVO_2$.

Examples of sulfides that can be used as the negative electrode active material include sulfides of titanium represented by the formula: $TiS_x$ (wherein x is an positive integer) such as $Ti_2S_3$, $TiS_2$ and TiS, sulfides of vanadium represented by the formula: $VS_x$ (wherein x is an positive integer)

such as $V_3S_4$, $VS_2$, and VS; sulfides of iron represented by the formula: $FeS_x$ (wherein x is an positive integer) such as $Fe_3S_4$, $FeS_2$ and FeS, sulfides of molybdenum represented by the formula: $MoS_x$ (wherein x is an positive integer) such as $Mo_2S_3$ and $MoS_2$, sulfides of tin represented by the formula: $SnS_x$ (wherein x is an positive integer) such as $SnS_2$ and SnS; sulfides of tungsten represented by the formula: $WS_x$ (wherein x is an positive integer) such as $WS_2$; sulfides of antimony represented by the formula $SbS_x$ (wherein x is an positive integer) such as $Sb_2S_3$; and sulfides of selenium represented by the formula: $SeS_x$ (wherein x is an positive integer) such as $Se_5S_3$, $SeS_2$ and SeS.

Examples of nitrides that can be used as the negative electrode active material include lithium-containing nitrides such as $Li_3N$ and $Li_{3-x}A_xN$ (wherein A is one or both of Ni and Co, and 0<x<3).

Each of the aforementioned carbonaceous materials, oxides, sulfides and nitrides may be used alone or in combination. Further, each of the aforementioned carbonaceous materials, oxides, sulfides and nitrides may be crystalline or amorphous.

Examples of metals that can be used as the negative electrode active material include lithium metals, silicon metals, tin metals, etc.

Examples of alloys that can be used as the negative electrode active material include lithium alloys such as Li—Al, Li—Ni, Li—Si, Li-Sn, and Li-Sn-Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_2$.

The metals or alloys are processed into, for example, a foil, and are in many cases used alone as an electrode.

Among the aforementioned negative electrode active materials, carbonaceous materials composed mainly of graphite such as natural graphite or artificial graphite are preferably used for reasons such as follows the potential of the negative electrode 120 hardly changes during charging from an uncharged state to a fully charged state (that is, the potential flatness is favorable), the average discharge potential is low, the capacity retention after repeated charge/discharge cycles is high (that is, the cycle performance is favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

Among the negative electrode active materials described above, it is preferable to use oxides for reasons such as high thermal stability and less likelihood of generation of dendrites (also referred to as dendritic crystal) by a Li metal. As a shape of the oxides, it is desirable that a fibrous form or an agglomerate of fine powders be used.

(Negative Electrode Current Collector)

Examples of the negative electrode current collector 122 included in the negative electrode 120 include a strip-shaped member composed of a metal material such as Cu. Ni or stainless steel as a component material. Among these, it is preferable to use a current collector which is made of Cu and is shaped into a thin film, since Cu is unlikely to form an alloy with lithium and can be easily processed.

Examples of the method for causing the negative electrode active material layer 121 to be supported on the negative electrode collector 122 include, as in the case of the positive electrode 110, a press forming method, a method that involves applying a paste-form negative electrode mix including a negative electrode active material on the negative electrode collector 122, followed by drying, and press-bonding the resulting dried product to the negative electrode current collector 122; and a method that involves applying a paste-form negative electrode mixture including a negative electrode active material on the negative electrode collector 122, followed by drying, and sintering the resulting dried product.

(Solid Electrolyte Layer)

The solid electrolyte layer 130 has the solid electrolyte described above.

The solid electrolyte layer 130 can be formed by depositing an inorganic solid electrolyte on a surface of the positive electrode active material laser 111 included in the positive electrode 110 described above through a sputtering method.

The solid electrolyte layer 130 can also be formed by applying a paste-form mixture including a solid electrolyte on a surface of the positive electrode active material layer 111 included in the positive electrode 110 described above, followed by drying. The solid electrolyte layer 130 may also be formed by a method that involves drying, press forming, and further pressing by cold isostatic pressing (CIP).

The laminate 100 can be produced by laminating, using a known method, the negative electrode 120 on the solid electrolyte layer 130 provided on the positive electrode 110 as described above so that the negative electrode active material layer 121 is in contact with the surface of the solid electrolyte layer 130.

Since the positive electrode active material having the above-described configuration uses the lithium metal composite compound produced according to the present embodiment described above, the cycle performance retention of the lithium secondary battery using the positive electrode active material can be improved.

Moreover, since the positive electrode having the above-described configuration has the positive electrode active material (for lithium secondary batteries) having the above-described configuration, the cycle performance retention of the lithium secondary battery can be improved.

Furthermore, since the lithium secondary battery having the above-described configuration has the positive electrode described above, such a lithium secondary battery is a secondary battery having high cycle performance retention.

Another aspect of the present invention is as follows.

[11] A lithium metal composite oxide powder, which has a layered structure, and includes at least Li, Ni, an element X. and an element M, wherein, the element X is at least one element selected from the group consisting of Co, Mn, Fe, Cu, Ti, Mg. Al, W. Mo. Nb. Zn, Sn, Zr, Ga and V, and the element M is at least one element selected from the group consisting of B, Si, S and P;

a molar ratio of Ni to a sum of Ni and the element X, Ni/(Ni+X), is 0.40 or more, a molar ratio of the element M to a sum of Ni and the element X, M/(Ni+X), is 0.005 or more and 0.05 or less; and the lithium metal composite oxide powder has core particles and coatings formed thereon, wherein the coatings have an amorphous structure and include the element M at a concentration of more than 0.0185 $mol/cm^3$ and 0.070 $mol/cm^3$ or less.

[12] The lithium metal composite oxide powder according to 1111, wherein the molar ratio (Ni/(Ni+X)) is 0.40 or more and 0.95 or less.

[13] The lithium metal composite oxide powder according to [11] or [12], which has a BET specific surface area of 0.1 m²/g or more and 1.0 m²/g or less.

[14] The lithium metal composite oxide powder according to any one of [11] to [13], wherein the coatings include a boron-containing compound.

[15] The lithium metal composite oxide powder according to any one of [11] to [14], which satisfies composition formula (I) below.

$$Li[Li_m(Ni_{(1-n-p)}X_nM_p)_{1-m}]O_2 \qquad (I)$$

wherein −0.1≤m≤0.2, 0<n≤0.6, 0<p≤0.05, and n+p<0.6.

[16] The lithium metal composite oxide powder according to 1151, wherein m in the composition formula (I) satisfies: 0<m≤0.1.

[17] The lithium metal composite oxide powder according to any one of [11] to [16], which has an average primary particle diameter of 1.1 μm or more and 6.5 μm or less.

[18] A positive electrode active material for a lithium secondary battery, including the lithium metal composite oxide powder of any one of [11] to [17].

[19] The lithium metal composite oxide powder according to any one of [11] to [18], wherein a ratio of an amount of Ni eluted is 1 ppm or more and 30 ppm or less, when an amount of Ni eluted into a half cell is measured following steps 1 to 5 below, wherein the half cell is manufactured by a method including producing a positive electrode for a lithium secondary battery, the positive electrode having a mass ratio of the lithium metal composite oxide powder, acetylene black and PVdF (lithium metal composite oxide powder:acetylene black:PVdF)=92:5:3, and an electrode area of 1.65 cm²; and manufacturing a half cell of a coin-type half cell R2032 including the positive electrode for a lithium secondary battery, a polyethylene porous film as a separator, a metallic lithium as a negative electrode, and an electrolytic solution prepared by dissolving LiPF₆ in a mixture of ethylene carbonate, dimethyl carbonate and ethyl methyl carbonate with a volume ratio of 30:35:35 such that an amount of LiPF₆ become 1.0 mol/L.

Step 1: The half cell is charged at a constant current and constant voltage with a maximum charging voltage of 4.4 V and a charging current of 0.2 CA.

Step 2: After charging, the half cell is stored in a fully charged state at 60° C. for 1 week.

Step 3: The stored half cell is disassembled, and the metallic lithium used as the negative electrode is dissolved in pure water.

Step 4: The amount of Ni eluted into the coin cell is calculated from the Ni concentration in the aqueous solution in which the metallic lithium is dissolved.

Step 5: The ratio (ppm) of the amount of Ni eluted with respect to the unit mass of the positive electrode active material used in the coin cell is calculated.

[20] A positive electrode active material for a lithium secondary battery, including the lithium metal composite oxide powder of any one of [11] to [19].

Further, the present invention has the following embodiments as well.

[21] A positive electrode for a lithium secondary battery, including the positive electrode active material of [20].

[22] A lithium secondary battery, including the positive electrode of [21].

EXAMPLES

Hereinbelow, the present invention will be described in more detail with reference to the Examples.

<Composition Analysis>

The composition analysis of the lithium metal composite oxide powder or the nickel-cobalt-manganese-zirconium composite hydroxide, each manufactured by the method described below, was carried out using an inductively coupled plasma emission spectrometer (SPS3000 manufactured by SII Nano Technology Inc.) after the lithium metal composite oxide powder was dissolved in hydrochloric acid.

<Measurement of BET Specific Surface Area>

1 g of the lithium metal composite oxide powder was dried at 105° C. for 30 min in a nitrogen atmosphere and the BET specific surface area was measured using Macsorb (registered trademark) manufactured by Mountech Co., Ltd (unit: m²/g).

<Measurement of Average Primary Particle Diameter>

The lithium metal composite oxide powder was placed on a conductive sheet attached onto a sample stage, and SEM observation was carried out by radiating an electron beam with an acceleration voltage of 20 kV using a scanning electron microscope (JSM-5510, manufactured by JEOL Ltd.). 50 primary particles were arbitrarily selected in an image (SEM photograph, magnified 10,000 times) obtained from the SEM observation, parallel lines were drawn from a certain direction so as to sandwich the projection image of each primary particle, and the distance between the parallel lines (Feret diameter) was measured as the particle diameter of the primary particle. The arithmetic average value of the obtained particle diameters was taken as the average primary particle diameter of the lithium metal composite oxide powder.

<Method for Measuring Concentration of Element M contained in Coatings>

The concentration of the element M contained in the coatings (unit: mol/cm³) was calculated by the following equation (1).

Concentration of element M (unit: mol/cm³)=Amount of element M (unit: mol/g)/[BET specific surface area (unit: cm²/g)×Average thickness of coatings (unit: cm)]  Equation (1)

In the equation (1), the amount of the element M is a value determined by the following method.

First, the obtained lithium metal composite oxide powder was dissolved in hydrochloric acid. Then, a composition analysis was implemented to determine the amount (mol/g) of the element M contained in the lithium metal composite oxide powder.

In the equation (1), the BET specific surface area is a value measured with respect to the obtained lithium metal composite oxide powder by the method described above.

In the equation (1), the average thickness of the coatings is a value determined from the analysis results obtained using a scanning electron microscopy (SEM)-energy dispersive X-ray spectroscopy (EDX). The measurement conditions and analysis conditions were as follows.

50 primary particles w ere randomly picked out from an image (SEM photograph) obtained through SEM observation (magnification: 10000 times) using a scanning electron microscope (JSM-7900F. manufactured by JEOL Ltd.). Elemental analysis was implemented on each of the primary particles using an energy dispersive X-ray spectrometer (X-Max Extreme, manufactured by Oxford Instruments). The acceleration voltage for the analysis was 1.1 kV.

The ratio of the element concentrations of Ni, the element X. and the element M determined from the results of the elemental analysis was calculated. The thicknesses of the coatings containing the element M were calculated from the results of analysis using the calculated ratio of the element concentrations. For the analysis, the probe mode of an analysis software (AZtec Layer, a product of Oxford Instruments) was used, and the analysis was performed on a model in which the element M alone is laminated on a manganese-cobalt-nickel oxide substrate, to thereby determine the thicknesses of the coatings containing the element M. The average value of the thicknesses of the coatings containing the element M, calculated for the 50 randomly selected primary particles, is defined as the average thickness of the coatings.

<Production of Positive Electrode for Lithium Secondary Battery>

A lithium metal composite oxide powder obtained by a production method described below, a conductive material (acetylene black), and a binder (PVdF) were mixed and kneaded so as to obtain a composition including the lithium metal composite oxide, the conductive material, and the binder at a mass ratio of 92:5:3, thereby preparing a paste-form positive electrode mix. In preparation of the positive electrode mix. N-methyl-2-pyrrolidone was used as an organic solvent.

The obtained positive electrode mix was applied to a 40 μm-thick Al foil which served as a current collector, and was dried in vacuo at 150° C. for 8 hours, thereby obtaining a positive electrode for a lithium secondary battery. The electrode area of the positive electrode for a lithium secondary battery was set to 1.65 cm$^2$ <Production of Lithium Secondary Battery (Coin-Type Half Cell)>

The following operations were carried out in an argon atmosphere within a glove box.

The positive electrode produced in <Production of Positive Electrode for Lithium Secondary Battery> was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 μm)) was placed on the positive electrode 300 μl of an electrolytic solution was injected thereinto. The electrolytic solution used was prepared by dissolving LiPF$_6$ in a mixture of ethylene carbonate, dimethyl carbonate and ethyl methyl carbonate with a volume ratio of 30:35:35 such that the amount of LiPF$_6$ became 1.0 mol/L.

Next, metal lithium used as a negative electrode was placed on the laminate film separator, covered with a top lid through a gasket, and swaged using a swage, thereby producing a lithium secondary battery (coin-type half cell R2032). Hereinafter, this battery may also be referred to as "half cell".

<Metal Elution Measurement>

The amount of metal elution into the half cell was measured under conditions described below, using the half cell produced in <Production of Lithium Secondary Battery (Coin-type Half Cell)>.

<Metal Elution Measurement>

The measurement was performed according to the following steps 1 to 5.

Step 1: The half cell is charged at a constant current and constant voltage with a maximum charging voltage of 4.4 V and a charging current of 0.2 CA.

Step 2: After charging, the half cell is stored in a fully charged state at 60° C. for 1 week.

Step 3. The stored half cell is disassembled, and the metallic lithium used as the negative electrode is dissolved in pure water.

Step 4: The amount of Ni eluted into the coin cell is calculated from the Ni concentration in the aqueous solution in which the metallic lithium is dissolved.

5: The ratio (ppm) of the amount of Ni eluted with respect to the unit mass of the positive electrode active material used in the coin cell is calculated.

Example 1

1. Production of Lithium Metal Composite Oxide Powder 1

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution, an aqueous manganese sulfate solution and an aqueous zirconium sulfate solution were mixed together such that the atomic ratio between nickel atoms, cobalt atoms, manganese atoms and zirconium atoms became 0.597:0.198:0.198:0.005.

Then, the obtained raw material mixture solution and an aqueous ammonium sulfate solution as a complexing agent w ere continuously added to the reaction vessel with stirring. An aqueous solution of sodium hydroxide was dropwise added to the reaction vessel at an appropriate timing such that the pH of the solution in the reaction vessel became 12.1, thereby obtaining nickel-cobalt-manganese-zirconium composite hydroxide particles. The obtained particles were washed, dehydrated by a centrifugal separator, separated and dried at 105° C. to obtain a nickel-cobalt-manganese-zirconium composite hydroxide 1. The composition analysis of the nickel-cobalt-manganese-zirconium composite hydroxide 1 revealed that Ni:Co:Mn=0.60:0.20:0.20, and Zr/(Ni+Co+Mn)=0.005 (both in terms of molar ratio).

The nickel-cobalt-manganese-zirconium composite hydroxide 1 and a lithium hydroxide monohydrate powder were weighed such that Li/(Ni+Co+Mn+Zr)=1.05 (molar ratio), followed by mixing. The resulting was calcined in an oxygen atmosphere at 970° C. for 5 hours, and the obtained calcined powder was charged into and disintegrated in a pin mill crusher operated at a rotation speed of 16000 rpm, thereby obtaining a raw material compound 1.

Next, the raw material compound 1 and boric acid were weighed such that B/(Ni+Co+Mn+Zr)=0.005 (molar ratio), followed by mixing. The resulting was heat-treated at 400° C. for 5 hours in a dry air atmosphere with a relative humidity of 10% or less, thereby obtaining a lithium metal composite oxide powder 1 having a layered structure.

2. Evaluation of Lithium Metal Composite Oxide Powder 1

The composition analysis of the lithium metal composite oxide powder 1 was implemented and the results were applied to the composition formula (I). As a result, it was found that m=0.02. The elements X were Co. Mn, and Zr, and n=0.398. The element M vas B, and p=0.005. It was also found that Ni/(Ni+X)=0.60 and M/(Ni+X)=0.005.

The SEM observation of the lithium metal composite oxide powder 1 revealed that the average primary particle diameter was 4.5 μm. The BET specific surface area of the lithium metal composite oxide powder 1 was 0.40 m$^2$/g.

3. Evaluation of Concentration of Element M Contained in Coatings of Lithium Metal Composite Oxide Powder 1

The composition analysis of the lithium metal composite oxide powder 1 revealed that the amount of B contained in the lithium metal composite oxide powder 1 was $4.6 \times 10^{-5}$ mol/g. The average thickness of the coatings determined through the SEM-EDX analysis was 4 nm. The concentration of B contained in the coatings of the lithium metal composite oxide powder 1 was 0.0289 mol/cm$^3$. Further, since the electron diffraction pattern of the coatings obtained using TEM showed a halo pattern, it was confirmed that the coatings had an amorphous structure.

As a result of the metal elution measurement with respect to a coin-type half cell using the lithium metal composite oxide powder 1, the elution amount of Ni per unit mass of the lithium metal composite oxide powder 1 was found to be 19.9 ppm.

Example 2

1. Production of Lithium Metal Composite Oxide Powder 2

A nickel-cobalt-manganese-zirconium composite hydroxide 1 was produced following the same procedure as in Example 1. Then, the nickel-cobalt-manganese-zirconium composite hydroxide 1 and a lithium hydroxide monohydrate powder were weighed such that Li/(Ni+Co+Mn+Zr)=1.05 (molar ratio), followed by mixing. The resulting was calcined in an oxygen atmosphere at 970° C. for 5 hours, and the obtained calcined powder was charged into and disintegrated in a pin mill crusher operated at a rotation speed of 16000 rpm, thereby obtaining a raw material compound 2.

Next, the raw material compound 2 and boric acid were weighed such that B/(Ni+Co+Mn+Zr)=0.020 (molar ratio), followed by mixing. The resulting was heat-treated at 400° C. for 5 hours in a dry air atmosphere with a relative humidity of 10% or less, thereby obtaining a lithium metal composite oxide powder 2 having a layered structure 2. Evaluation of Lithium Metal Composite Oxide Powder 2

The composition analysis of the lithium metal composite oxide powder 2 was implemented and the results were applied to the composition formula (I). As a result, it was found that m=0.02. The elements X were Co, Mn. and Zr, and n=0.388. The element M was B, and p=0.017 It was also found that Ni/(Ni+X)=0.61 and M/(Ni+X)=0.017.

The SEM observation of the lithium metal composite oxide powder 2 revealed that the average primary particle diameter was 4.5 μm. The BET specific surface area of the lithium metal composite oxide powder 2 was 0.50 m$^2$/g.

3. Evaluation of Concentration of Element M contained in Coatings of Lithium Metal Composite Oxide Powder 2

The composition analysis of the lithium metal composite oxide powder 2 revealed that the amount of B contained in the lithium metal composite oxide powder 2 was $1.6 \times 10^{-4}$ mol/g. The average thickness of the coatings determined through the SEM-EDX analysis w as 6 nm. The concentration of B contained in the coatings of the lithium metal composite oxide powder 2 was 0.0524 mol/cm$^3$.

As a result of the metal elution measurement with respect to a coin-type half cell using the lithium metal composite oxide powder 2, the elution amount of Ni per unit mass of the lithium metal composite oxide powder 2 was found to be 12.6 ppm.

Example 3

1. Production of Lithium Metal Composite Oxide Powder 3

A nickel-cobalt-manganese-zirconium composite hydroxide 1 was produced following the same procedure as in Example 1. Then, the nickel-cobalt-manganese-zirconium composite hydroxide 1 and a lithium hydroxide monohydrate powder were weighed such that Li/(Ni+Co+Mn+Zr)=1.05 (molar ratio), followed by mixing. The resulting was calcined in an oxygen atmosphere at 950° C. for 5 hours, and the obtained calcined powder was charged into and disintegrated in a pin mill crusher operated at a rotation speed of 16000 rpm thereby obtaining a raw material compound 3.

Next, the raw material compound 3 and boric acid were weighed such that B/(Ni+Co+Mn+Zr)=0.010 (molar ratio), followed by mixing. The resulting was heat-treated at 500° C. for 5 hours in a dry air atmosphere with a relative humidity of 10% or less, thereby obtaining a lithium metal composite oxide powder 3 having a layered structure.

2. Evaluation of Lithium Metal Composite Oxide Powder 3

The composition analysis of the lithium metal composite oxide powder 3 was implemented and the results were applied to the composition formula (I). As a result, it was found that m=0.02. The elements X were Co. Mn, and Zr, and n=0.394. The element M was B, and p=0.009. It was also found that Ni/(Ni+X)=0.60 and M/(Ni+X)=0.009.

The SEM observation of the lithium metal composite oxide powder 3 revealed that the average primary particle diameter was 4.0 μm. The BET specific surface area of the lithium metal composite oxide powder 3 was 0.80 m$^2$/g.

3. Evaluation of Concentration of Element M contained in Coatings of Lithium Metal Composite Oxide Powder 3

The composition analysis of the lithium metal composite oxide powder 3 revealed that the amount of B contained in the lithium metal composite oxide powder 3 was $9.3 \times 10^{-5}$ mol/g. The average thickness of the coatings determined through the SEM-EDX analysis was 3 nm. The concentration of B contained in the coatings of the lithium metal composite oxide powder 3 was 0.0385 mol/cm$^3$.

As a result of the metal elution measurement with respect to a coin-type half cell using the lithium metal composite oxide pow der 3, the elution amount of Ni per unit mass of the lithium metal composite oxide powder 3 was found to be 24.2 ppm.

Example 4

1. Production of Lithium Metal Composite Oxide Powder 4

An aqueous nickel sulfate solution, an aqueous cobalt sulfate solution and an aqueous manganese sulfate solution were mixed together such that the atomic ratio between nickel atoms, cobalt atoms and manganese atoms became 0.91:0.07:0.02, to thereby prepare a raw material mixture solution.

Then, the obtained raw material mixture solution and an aqueous ammonium sulfate solution as a complexing agent were continuously added to the reaction vessel with stirring. An aqueous solution of sodium hydroxide was dropwise added to the reaction vessel at an appropriate timing such that the pH of the solution in the reaction vessel became 12.5, thereby obtaining nickel-cobalt-manganese composite hydroxide particles. The obtained particles were washed, dehydrated by a centrifugal separator, separated and dried at 105° C. to obtain a nickel-cobalt-manganese composite hydroxide 1. The composition analysis of the nickel-cobalt-manganese composite hydroxide 1 revealed that Ni:Co:Mn=0.91:0.07:0.02 (molar ratio).

The nickel-cobalt-manganese composite hydroxide 1 and a lithium hydroxide monohydrate powder were weighed such that Li/(Ni+Co+Mn)=1.10 (molar ratio) to obtain a mixture, and potassium sulfate as an inert melting agent was also weighed such that the amount (molar ratio) of the potassium sulfate became 0.1, based on the total amount of lithium hydroxide and potassium sulfate, followed by mixing. The resulting was calcined in an oxygen atmosphere at 790° C. for 5 hours, thereby obtaining a calcined powder. The obtained calcined powder was pulverized, dispersed in pure water at 5° C., and then dehydrated. Further, after heating at 80° C. for 15 hours, the powder was continuously heated at 150° C. for 9 hours to dry, thereby obtaining a raw material compound 4.

Next, the raw material compound 4 and boric acid were weighed such that B/(Ni+Co+Mn)=0.020 (molar ratio), followed by mixing. The resulting was heat-treated at 400° C. for 5 hours in a dry air atmosphere with a relative humidity of 10% or less, thereby obtaining a lithium metal composite oxide powder 4 having a layered structure.

2. Evaluation of Lithium Metal Composite Oxide Powder 4

The composition analysis of the lithium metal composite oxide powder 4 was implemented and the results were applied to the composition formula (I). As a result, it was found that m=0.02. The elements X were Co and Mn, and n=0.073. The element M was B, and p=0.019. It was also found that Ni/(Ni+X)=0.93 and M/(Ni+X)=0.019.

The SEM observation of the lithium metal composite oxide powder 4 revealed that the average primary particle diameter was 4.0 μm. The BET specific surface area of the lithium metal composite oxide powder 4 was 0.90 m$^2$/g.

3. Evaluation of Concentration of Element M contained in Coatings of Lithium Metal Composite Oxide Powder 4

The composition analysis of the lithium metal composite oxide powder 4 revealed that the amount of B contained in the lithium metal composite oxide powder 4 was $1.8 \times 10^{-4}$ mol/g. The average thickness of the coatings determined through the SEM-EDX analysis was 5 nm. The concentration of B contained in the coatings of the lithium metal composite oxide powder 4 was 0.0391 mol/cm.

As a result of the metal elution measurement with respect to a coin-type half cell using the lithium metal composite oxide powder 4, the elution amount of Ni per unit mass of the lithium metal composite oxide powder 4 was found to be 18.5 ppm.

Comparative Example 1

1. Production of Lithium Metal Composite Oxide Powder 5

A nickel-cobalt-manganese-zirconium composite hydroxide 1 was produced following the same procedure as in Example 1 Then, the nickel-cobalt-manganese-zirconium composite hydroxide 1 and a lithium hydroxide monohydrate powder were weighed such that Li/(Ni+Co+Mn+Zr)=1.05 (molar ratio), followed by mixing. The resulting was calcined in an oxygen atmosphere at 970° C. for 5 hours, and the obtained calcined powder was charged into and disintegrated in a pin mill crusher operated at a rotation speed of 16000 rpm, thereby obtaining a raw material compound 5.

Next, without addition of boric acid, the raw material compound 5 was heat-treated at 400° C. for 5 hours in a dry air atmosphere with a relative humidity of 10% or less, thereby obtaining a lithium metal composite oxide powder 5 having a layered structure 2. Evaluation of Lithium Metal Composite Oxide Powder 5

The composition analysis of the lithium metal composite oxide powder 5 was implemented and the results were applied to the composition formula (I). As a result, it was found that m=0.02. The elements X were Co, Mn, and Zr, and n=0.399. Further, it was also found that p=0.0, Ni/(Ni+X)=0.60, and M/(Ni+X)=0.

The SEM observation of the lithium metal composite oxide powder 5 revealed that the average primary particle diameter was 4.5 μm. The BET specific surface area of the lithium metal composite oxide powder 5 was 0.40 m$^2$/g.

3. Evaluation of Concentration of Element M contained in Coatings of Lithium Metal Composite Oxide Powder 5

The composition analysis of the lithium metal composite oxide powder 5 revealed that the amount of the element M contained in the lithium metal composite oxide powder was 0.0 mol/g. Further, the analysis using SEM-EDX revealed that the lithium metal composite oxide powder 5 lacked a coating layer containing the element M.

As a result of the metal elution measurement with respect to a coin-type half cell using the lithium metal composite oxide powder 5, the elution amount of Ni per unit mass of the lithium metal composite oxide powder 5 was found to be 49.9 ppm.

Comparative Example 2

1. Production of Lithium Metal Composite Oxide Powder 6

A nickel-cobalt-manganese-zirconium composite hydroxide 1 was produced following the same procedure as in Example 1. Then, the nickel-cobalt-manganese-zirconium composite hydroxide 1 and a lithium hydroxide monohydrate powder were weighed such that Li/(Ni+Co+Mn+Zr)=1.05 (molar ratio), followed by mixing. The resulting was calcined in an oxygen atmosphere at 970° C. for 5 hours, and the obtained calcined powder was charged into and disintegrated in a pin null crusher operated at a rotation speed of 16000 rpm, thereby obtaining a raw material compound 6.

Next, the raw material compound 6 and boric acid were weighed such that B/(Ni+Co+Mn+Zr)=0.020 (molar ratio), followed by mixing. The resulting was heat-treated at 200° C. for 5 hours in a dry air atmosphere with a relative humidity of 10% or less, thereby obtaining a lithium metal composite oxide powder 6 having a layered structure.

2. Evaluation of Lithium Metal Composite Oxide Powder 6

The composition analysis of the lithium metal composite oxide powder 6 was implemented and the results were applied to the composition formula (I). As a result, it was found that m=0.02. The elements X were Co. Mn. and Zr, and n=0.395 The element M was B. and p=0.018. It was also found that Ni/(Ni+X)=0.60 and M/(Ni+X)=0.005.

The SEM observation of the lithium metal composite oxide powder 6 revealed that the average primary particle diameter was 4.5 μm. The BET specific surface area of the lithium metal composite oxide powder 6 was 0.5 m$^2$/g.

3. Evaluation of Concentration of Element M contained in Coatings of Lithium Metal Composite Oxide Powder 6

The composition analysis of the lithium metal composite oxide powder 6 revealed that the amount of B contained in the lithium metal composite oxide powder 6 was $1.7 \times 10^4$ mol/g. The average thickness of the coatings determined through the SEM-EDX analysis was 20 nm. The concentration of B contained in the coatings of the lithium metal composite oxide powder 6 was 0.0167 mol/cm$^3$. Further, since the electron diffraction pattern of the coatings obtained using TEM showed a halo pattern, it was confirmed that the coatings had an amorphous structure.

As a result of the metal elution measurement with respect to a coin-type half cell using the lithium metal composite oxide powder 6, the elution amount of Ni per unit mass of the lithium metal composite oxide powder 6 was found to be 49.9 ppm.

Comparative Example 3

1. Production of Lithium Metal Composite Oxide Powder 7

A nickel-cobalt-manganese-zirconium composite hydroxide 1 was produced following the same procedure as in Example 1. Then, the nickel-cobalt-manganese-zirconium composite hydroxide 1 and a lithium hydroxide monohydrate powder were weighed such that Li/(Ni+Co+Mn+Zr)=1.05 (molar ratio), followed by mixing. The resulting was calcined in an oxygen atmosphere at 970° C. for 5 hours, and the obtained calcined powder was charged into and disintegrated in a pin mill crusher operated at a rotation speed of 16000 rpm, thereby obtaining a raw material compound 7.

Next, the raw material compound 7 and boron oxide were weighed such that B/(Ni+Co+Mn+Zr)=0.020 (molar ratio), followed by mixing. The resulting was heat-treated at 200° C. for 5 hours in a dry air atmosphere with a relative humidity of 10% or less, thereby obtaining a lithium metal composite oxide powder 7 having a layered structure.

2. Evaluation of Lithium Metal Composite Oxide Powder 7

The composition analysis of the lithium metal composite oxide powder 7 was implemented and the results were applied to the composition formula (I). As a result, it was found that m=0.02. The elements X were Co, Mn, and Zr, and n=0.389. The element M was B, and p=0.020. It was also found that Ni/(Ni+X)=0.60 and M/(Ni+X)=0.020.

The SEM observation of the lithium metal composite oxide powder 7 revealed that the average primary particle diameter was 4.5 μm. The BET specific surface area of the lithium metal composite oxide powder 7 was 0.50 m²/g.

3. Evaluation of Concentration of Element M contained in Coatings of Lithium Metal Composite Oxide Powder 7

The composition analysis of the lithium metal composite oxide powder 7 revealed that the amount of B contained in the lithium metal composite oxide powder 7 was $1.9 \times 10^{-4}$ mol/g. The average thickness of the coatings determined through the SEM-EDX analysis was 5 nm. The concentration of B contained in the coatings of the lithium metal composite oxide powder 7 was 0.0740 mol/cm³. Further, since the electron diffraction pattern of the coatings obtained using TEM showed a halo pattern, it was confirmed that the coatings had an amorphous structure.

As a result of the metal elution measurement with respect to a coin-type half cell using the lithium metal composite oxide powder 7, the elution amount of Ni per unit mass of the lithium metal composite oxide powder 7 was found to be 48.4 ppm.

Table 1 below shows the composition, the concentration of the element M contained in the coatings, (Ni/(Ni+X)), (M/(Ni+X)), the average primary particle diameter, the BET specific surface area, and the nickel elution amount are described together for each of Examples 1 to 4 and Comparative Examples 1 to 3.

TABLE 1

| | Li[Li$_m$(Ni$_{(1-n-p)}$X$_n$M$_p$)$_{1-m}$]O$_2$ | | | | | Ni/(Ni + χ) molar ratio | M/(Ni + X) molar ratio | Concentration of element M in coatings mol/cm³ | Average primary particle diameter μm | BET specific surface area m²/g | Ni elution amount ppm |
|---|---|---|---|---|---|---|---|---|---|---|---|
| | Li m | Ni 1 − n − p | X n | M p | Element X | Element M | | | | | | |
| Ex. 1 | 0.02 | 0.597 | 0.398 | 0.005 | Co, Mn, Zr | B | 0.60 | 0.005 | 0.0289 | 4.5 | 0.4 | 19.9 |
| Ex. 2 | 0.02 | 0.595 | 0.388 | 0.017 | Co, Mn, Zr | B | 0.61 | 0.017 | 0.0524 | 4.5 | 0.5 | 12.6 |
| Ex. 3 | 0.02 | 0.597 | 0.394 | 0.009 | Co, Mn, Zr | B | 0.60 | 0.009 | 0.0385 | 4.0 | 0.8 | 24.2 |
| Ex. 4 | 0.04 | 0.908 | 0.073 | 0.019 | Co, Mn | B | 0.93 | 0.019 | 0.0391 | 3.5 | 0.9 | 18.5 |
| Comp. Ex. 1 | 0.02 | 0.601 | 0.399 | 0.000 | Co, Mn, Zr | — | 0.60 | 0.000 | 0.0000 | 4.5 | 0.5 | 53.8 |
| Comp. Ex. 2 | 0.02 | 0.597 | 0.398 | 0.005 | Co, Mn, Zr | B | 0.60 | 0.005 | 0.0167 | 4.5 | 0.5 | 49.9 |
| Comp. Ex. 3 | 0.02 | 0.591 | 0.389 | 0.020 | Co, Mn, Zr | B | 0.60 | 0.020 | 0.0740 | 4.5 | 0.5 | 48.4 |

As shown in Table 1 above, the nickel elution amounts in Examples 1 to 4 were lower than those in Comparative Examples 1 to 3.

DESCRIPTION OF THE REFERENCE SIGNS

1 Separator
2 Positive electrode
3 Negative electrode
4 Electrode group
5 Battery can
6 Electrolytic solution
7 Top insulator
8 Sealing body
10 Lithium secondary battery
21 Positive electrode lead
31 Negative electrode lead
100 Laminate
110 Positive electrode
111 Positive electrode active material layer
112 Positive electrode current collector
113 External terminal
120 Negative electrode
121 Negative electrode active material layer
122 Negative electrode current collector
123 External terminal
130 Solid electrolyte layer
200 Exterior body
200a Opening
1000 All-solid-state lithium battery

The invention claimed is:

1. A lithium metal composite oxide powder, which has a layered structure, and comprises at least Li, Ni, an element X, and an element M, wherein:
   the element X is at least one element selected from the group consisting of Co, Mn, Fe, Cu, Ti, Mg, Al, W, Mo, Nb, Zn, Sn, Zr, Ga and V, and the element M is at least one element selected from the group consisting of B, Si, S and P;
   a molar ratio of Ni to a sum of Ni and the element X, Ni/(Ni+X), is 0.40 or more;

a molar ratio of the element M to a sum of Ni and the element X, M/(Ni+X), is more than 0 and 0.05 or less; and the lithium metal composite oxide powder has core particles and coatings formed thereon, the coatings comprising the element M at a concentration of more than 0.0185 mol/cm$^3$ and 0.070 mol/cm$^3$ or less.

2. The lithium metal composite oxide powder according to claim 1, which has a BET specific surface area of 2 m$^2$/g or less.

3. The lithium metal composite oxide powder according to claim 1 wherein the coatings comprise a boron-containing compound.

4. The lithium metal composite oxide powder according to claim 1, which satisfies composition formula (I) below:

$$\text{Li}[\text{Li}_m(\text{Ni}_{(1-n-p)}\text{X}_n\text{M}_p)_{1-m}]\text{O}_2 \quad (\text{I})$$

wherein −0.1≤m≤0.2, 0<n≤0.6, 0<p≤0.05, and n+p<0.6.

5. The lithium metal composite oxide powder according to claim 4, wherein m in the composition formula (I) satisfies: 0<m≤0.2.

6. The lithium metal composite oxide powder according to claim 1, which has an average primary particle diameter of 1 μm or more and 7 μm or less.

7. The lithium metal composite oxide powder according to claim 1, wherein the coatings have an amorphous structure.

8. A positive electrode active material for a lithium secondary battery, comprising the lithium metal composite oxide powder of claim 1.

9. A positive electrode comprising the positive electrode active material of claim 8.

10. A lithium secondary battery comprising the positive electrode of claim 9.

* * * * *